US012731533B2

(12) United States Patent
Hu et al.

(10) Patent No.: US 12,731,533 B2
(45) Date of Patent: Sep. 8, 2026

(54) ARRAY SUBSTRATE, METHOD FOR DRIVING PIXEL CIRCUIT, DISPLAY PANEL AND DISPLAY APPARATUS

(71) Applicants: Chongqing BOE Display Technology Co., Ltd., Chongqing (CN); BOE TECHNOLOGY GROUP CO., LTD., Beijing (CN)

(72) Inventors: Ming Hu, Beijing (CN); Rui Wang, Beijing (CN); Xiaoling He, Beijing (CN); Xiangdan Dong, Beijing (CN); Haigang Qing, Beijing (CN); Gukhwan Song, Beijing (CN); Yuanyou Qiu, Beijing (CN); Runxin Zhang, Beijing (CN); Zhiliang Jiang, Beijing (CN); Yi Zhang, Beijing (CN); Xueguang Hao, Beijing (CN); Shouqiang Zhang, Beijing (CN); Chao Zeng, Beijing (CN); Ni Yang, Beijing (CN); Yao Huang, Beijing (CN); Hongtao Weng, Beijing (CN)

(73) Assignees: Chongqing BOE Display Technology Co., Ltd., Chongqing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/992,862

(22) PCT Filed: May 14, 2024

(86) PCT No.: PCT/CN2024/093196
§ 371 (c)(1),
(2) Date: Jan. 9, 2025

(87) PCT Pub. No.: WO2025/001579
PCT Pub. Date: Jan. 2, 2025

(65) Prior Publication Data

US 2026/0011287 A1 Jan. 8, 2026

(30) Foreign Application Priority Data

Jun. 30, 2023 (CN) ......................... 202310805073.7

(51) Int. Cl.
*G09G 3/32* (2016.01)
*G09G 3/3233* (2016.01)

(52) U.S. Cl.
CPC ............. *G09G 3/32* (2013.01); *G09G 3/3233* (2013.01); *G09G 2300/0465* (2013.01);
(Continued)

(58) Field of Classification Search
None
See application file for complete search history.

(56) References Cited

U.S. PATENT DOCUMENTS

2021/0057450 A1 2/2021 Wu et al.
2022/0270542 A1 8/2022 Park et al.
(Continued)

FOREIGN PATENT DOCUMENTS

CN 104124279 A 10/2014
CN 110010058 A 7/2019
(Continued)

*Primary Examiner* — Christopher J Kohlman
(74) *Attorney, Agent, or Firm* — The Webb Law Firm

(57) ABSTRACT

An array substrate includes a substrate and pixel circuits disposed on the first substrate. A pixel circuit includes a first light-emitting control transistor and a second light-emitting control transistor. The array substrate further includes a first light-emitting control signal line and a second light-emitting control signal line. The first light-emitting control signal line is electrically connected to a gate of the first light-emitting control transistor. The second light-emitting control signal line is electrically connected to a gate of the second light-emitting control transistor. The array substrate further includes conductive layers. The first light-emitting control signal line and the second light-emitting control signal line are electrically insulated. The first light-emitting control signal line and the second light-emitting control signed line (Continued)

are located in different conductive layers. Orthographic projections on the substrate, of the first light-emitting control signal line and the second light-emitting control signal line do not overlap.

17 Claims, 13 Drawing Sheets

(52) U.S. Cl.
CPC . *G09G 2300/0819* (2013.01); *G09G 2310/08* (2013.01); *G09G 2320/0247* (2013.01); *G09G 2320/064* (2013.01)

(56) References Cited

U.S. PATENT DOCUMENTS

| | | | |
|---|---|---|---|
| 2022/0319423 | A1 | 10/2022 | Yang et al. |
| 2024/0078971 | A1* | 3/2024 | Han ..................... H10D 86/451 |
| 2024/0203343 | A1 | 6/2024 | Guo et al. |

FOREIGN PATENT DOCUMENTS

| | | | |
|---|---|---|---|
| CN | 110911438 | A | 3/2020 |
| CN | 114175257 | A | 3/2022 |
| CN | 115019734 | A | 9/2022 |
| CN | 115497964 | A | 12/2022 |
| CN | 116312367 | A | 6/2023 |
| GB | 2610947 | A | 3/2023 |
| TW | I799055 | B | 4/2023 |
| WO | 2022226845 | A1 | 11/2022 |
| WO | 2022226846 | A1 | 11/2022 |
| WO | 2022232987 | A1 | 11/2022 |
| WO | 2022232988 | A1 | 11/2022 |
| WO | 2023044680 | A1 | 3/2023 |

* cited by examiner

ARRAY SUBSTRATE, METHOD FOR DRIVING PIXEL CIRCUIT, DISPLAY PANEL AND DISPLAY APPARATUS

CROSS-REFERENCE TO RELATED APPLICATIONS

This application is the United States national phase of International Patent Application No. PCT/CN2024/093196, filed May 14, 2024, and claims priority to Chinese Patent Application No. 202310805073.7, filed Jun. 30, 2023, the disclosures of which are hereby incorporated by reference in their entireties.

BACKGROUND OF THE INVENTION

Field of the Invention

The present disclosure relates to the field of display technologies, and in particular, to an array substrate, a method for driving a pixel circuit, a display panel and a display apparatus.

Description of Related Art

With the development of display technologies, display apparatuses such as mobile phones, televisions and computers are increasingly used in people's lives. The display apparatus includes pixel circuits and light-emitting devices. The pixel circuit controls a driving current flowing through the light-emitting device to drive the light-emitting device to display different grayscales, thereby realizing image display. The luminous efficiency of the light-emitting device will decrease as the current density decreases under low current density conditions. In order to improve the luminous efficiency of the light-emitting device, a pulse width modulation (PWM) dimming method is introduced into the pixel circuit to adjust the brightness of the light-emitting device. The PWM dimming method controls the light-emitting time of the light-emitting device, adjusts the luminance of the light-emitting device, changes the overall brightness of the display image, and makes the overall brightness of the display image more stable.

SUMMARY OF THE INVENTION

In an aspect, an array substrate is provided. The array substrate includes a substrate and a plurality of pixel circuits disposed on the substrate. The plurality of pixel circuits are arranged in a plurality of rows and a plurality of columns, and a pixel circuit includes a first light-emitting control transistor and a second light-emitting control transistor. The array substrate further includes a first light-emitting control signal line and a second light-emitting control signal line. The first light-emitting control signal line is electrically connected to a gate of the first light-emitting control transistor. The second light-emitting control signal line is electrically connected to a gate of the second light-emitting control transistor. The array substrate further includes a plurality of conductive layers, the first light-emitting control signal line and the second light-emitting control signal line are electrically insulated, the first light-emitting control signal line and the second light-emitting control signal line are located in different conductive layers, and an orthographic projection of the first light-emitting control signal line on the substrate does not overlap with an orthographic projection of the second light-emitting control signal line on the substrate.

In some embodiments, the plurality of conductive layers include a first gate conductive layer and a first source-drain conductive layer. The first gate conductive layer includes a first gate pattern and the second light-emitting control signal line. The first gate pattern constitutes the gate of the first light-emitting control transistor. The first source-drain conductive layer is disposed on a side of the first gate conductive layer away from the substrate and includes the first light-emitting control signal line. The orthographic projection of the first light-emitting control signal line on the substrate partially overlaps with an orthographic projection of the first gate pattern on the substrate, and the first light-emitting control signal line is electrically connected to the first gate pattern.

In some embodiments, the pixel circuit includes a driving transistor. The array substrate further includes a semiconductor layer disposed between the substrate and the first gate conductive layer. The semiconductor layer includes a first channel region of the first light-emitting control transistor, a second channel region of the second light-emitting control transistor, a third channel region of the driving transistor, a first connection region and a second connection region. The first connection region and the second connection region are respectively located on two opposite sides of the third channel region. The first connection region is connected to the third channel region and the second channel region. The second connection region is connected to the third channel region and the first channel region. The orthographic projection of the first gate pattern on the substrate partially overlaps with an orthographic projection of the first channel region on the substrate, and does not overlap with an orthographic projection of the first connection region on the substrate. The orthographic projection of the second light-emitting control signal line on the substrate partially overlaps with an orthographic projection of the second channel region on the substrate.

In some embodiments, the pixel circuit further includes a first reset transistor; the semiconductor layer further includes a third connection region and a fourth channel region of the first reset transistor; the first gate conductive layer further includes a fourth gate pattern, and an orthographic projection of the fourth gate pattern on the substrate at least partially overlaps with an orthographic projection of the fourth channel region on the substrate; the first source-drain conductive layer further includes a first enable signal line and a first transfer block; an orthographic projection of the first enable signal line on the substrate partially overlaps with the orthographic projection of the fourth gate pattern on the substrate; the first enable signal line is electrically connected to the fourth gate pattern; the first transfer block is electrically connected to the third connection region and a gate of the driving transistor; the array substrate further includes a second gate conductive layer; the second gate conductive layer is disposed between the first gate conductive layer and the first source-drain conductive layer, and includes a first initialization voltage signal line; and the first initialization voltage signal line is electrically connected to a first electrode of the first reset transistor.

In some embodiments, the pixel circuit further includes a compensation transistor; the semiconductor layer further includes a fifth channel region of the compensation transistor, an end of the fifth channel region is connected to the first connection region, and another end of the fifth channel region is connected to the third connection region; the first gate conductive layer further includes a fifth gate pattern, and an orthographic projection of the fifth gate pattern on the substrate partially overlaps with an orthographic projection of the fifth channel region on the substrate; the first source-drain conductive layer further includes a second enable signal line; an orthographic projection of the second enable signal line on the substrate partially overlaps with the orthographic projection of the fifth gate pattern on the substrate; and the second enable signal line is electrically connected to the fifth gate pattern.

In some embodiments, the compensation transistor is a double-gate transistor, and the fifth channel region includes a first sub-region and a second sub-region that are spaced apart; the semiconductor layer further includes a fourth connection region, and the fourth connection region is located between the first sub-region and the second sub-region and connected to the first sub-region and the second sub-region; the second gate conductive layer further includes a first blocking portion, and an orthographic projection of the first blocking portion on the substrate at least partially overlaps with an orthographic projection of the fourth connection region on the substrate.

In some embodiments, the second gate conductive layer further includes a second blocking portion; and orthographic projections, on the substrate, of the second blocking portion, the third connection region, and the second enable signal line at least partially overlap.

In some embodiments, the pixel circuit further includes a data writing transistor; the semiconductor layer further includes a sixth channel region of the data writing transistor; the fifth channel region and the sixth channel region are staggered in a first direction; the sixth channel region is connected to the second connection region; the first direction is a column direction in which the plurality of pixel circuits are arranged; the first gate conductive layer further includes a sixth gate pattern, and an orthographic projection of the sixth gate pattern on the substrate partially overlaps with an orthographic projection of the sixth channel region on the substrate; the first source-drain conductive layer further includes a first scan signal line; an orthographic projection of the first scan signal line on the substrate partially overlaps with the orthographic projection of the sixth gate pattern on the substrate; and the first scan signal line is electrically connected to the sixth gate pattern.

In some embodiments, the pixel circuit further includes a second reset transistor; the semiconductor layer further includes a seventh channel region of the second reset transistor; the first gate conductive layer further includes a seventh gate pattern, and an orthographic projection of the seventh gate pattern on the substrate partially overlaps with an orthographic projection of the seventh channel region on the substrate; the second gate conductive layer further includes a second initialization voltage signal line, and the second initialization voltage signal line is electrically connected to a first electrode of the second reset transistor; the first source-drain conductive layer further includes a second scan signal line; an orthographic projection of the second scan signal line on the substrate partially overlaps with the orthographic projection of the seventh gate pattern on the substrate; and the second scan signal line is electrically connected to the seventh gate pattern.

In some embodiments, the array substrate further includes a light-shielding layer. The light-shielding layer is disposed between the substrate and the semiconductor layer, and an orthographic projection of the light-shielding layer on the substrate at least partially overlaps with an orthographic projection of the semiconductor layer on the substrate.

In some embodiments, the array substrate has a display region and a peripheral region surrounding the display region; the array substrate includes a plurality of first initialization voltage signal lines, a plurality of second initialization voltage signal lines and a second voltage signal bus; a row of pixel circuits is electrically connected to a single first initialization voltage signal line and a single second initialization voltage signal line; and the second voltage signal bus is disposed in the peripheral region and at least partially surrounds the display region; the array substrate further includes a second source-drain conductive layer; the second source-drain conductive layer is disposed on a side of the first source-drain conductive layer away from the substrate, and includes a plurality of first connection lines extending in a first direction, a plurality of second connection lines extending in the first direction, and a plurality of third connection lines extending in the first direction; each first connection line is electrically connected to the plurality of first initialization voltage signal lines; each second connection line is electrically connected to the plurality of second initialization voltage signal lines; and each third connection line extends to the peripheral region and is electrically connected to the second voltage signal bus.

In another aspect, a method for driving a pixel circuit is provided. The pixel circuit includes a driving transistor, a first light-emitting control transistor, and a second light-emitting control transistor; a gate of the first light-emitting control transistor is electrically connected to a first light-emitting control signal line, a first electrode of the first light-emitting control transistor is electrically connected to a first voltage signal line, and a second electrode of the first light-emitting control transistor is electrically connected to a first electrode of the driving transistor; a gate of the second light-emitting control transistor is electrically connected to a second light-emitting control signal line, a first electrode of the second light-emitting control transistor is electrically connected to a second electrode of the driving transistor, and a second electrode of the second light-emitting control transistor is electrically connected to a light-emitting device; the first light-emitting control signal line is configured to transmit a first pulse width modulation signal; and the second light-emitting control signal line is configured to transmit a second pulse width modulation signal.

A display cycle includes a light-emitting phase. The method includes that: in the light-emitting phase, the first pulse width modulation signal has a first operating level period, the second pulse width modulation signal has a second operating level period, the first operating level period is different from the second operating level period, and the first operating level period partially overlaps with the second operating level period.

In some embodiments, an amplitude of the first pulse width modulation signal is the same as an amplitude of the second pulse width modulation signal, a frequency of the first pulse width modulation signal is the same as a frequency of the second pulse width modulation signal, and a duty cycle of the first pulse width modulation signal is the same as a duty cycle of the second pulse width modulation signal; and a start time of the first operating level period is later than a start time of the second operating level period, and an end time of the first operating level period is later than an end time of the second operating level period.

In some embodiments, the pixel circuit further includes a first reset transistor, a second reset transistor, a data writing transistor and a compensation transistor; a gate of the first reset transistor is electrically connected to a first enable signal line, a first electrode of the first reset transistor is electrically connected to a first initialization voltage signal line, and a second electrode of the first reset transistor is electrically connected to a gate of the driving transistor; a gate of the second reset transistor is electrically connected to a second scan signal line, a first electrode of the second reset transistor is electrically connected to a second initialization voltage signal line, and a second electrode of the second reset transistor is electrically connected to the second electrode of the second light-emitting control transistor; a gate of the data writing transistor is electrically connected to a first scan signal line, a first electrode of the data writing transistor is electrically connected to a data line, and a second electrode of the data writing transistor is electrically connected to the first electrode of the driving transistor; a gate of the compensation transistor is electrically connected to a second enable signal line, a first electrode of the compensation transistor is electrically connected to the second electrode of the driving transistor, and a second electrode of the compensation transistor is electrically connected to the gate of the driving transistor.

The display cycle further includes a blank phase; in the blank phase, at least one of the first light-emitting control transistor and the second light-emitting control transistor is turned off; the blank phase includes a first initialization phase, a second initialization phase and a data writing phase. The method further as follows that: in the first initialization stage, the first reset transistor is turned on under control of a first enable signal from the first enable signal line and transmits a first initialization voltage signal from the first initialization voltage signal line to the gate of the driving transistor; in the second initialization phase, the first reset transistor remains on, and the compensation transistor is turned on under control of a second enable signal from the second enable signal line and transmits the first initialization voltage signal to the second electrode of the driving transistor; and in the data writing phase, the compensation transistor remains on, and the data writing transistor is turned on under control of a first scan signal from the first scan signal line and transmits a data signal from the data line to the first electrode of the driving transistor.

In some embodiments, the blank phase further includes a bias phase following the data writing phase. The method further includes that: in the bias phase, the first light-emitting control transistor is turned off, the second light-emitting control transistor is turned on, and the second reset transistor is turned on under control of a second scan signal of the second scan signal line and transmits a second initialization voltage signal from the second initialization voltage signal line to the second electrode of the second light-emitting control transistor and then to the first electrode of the driving transistor.

In some embodiments, in the second initialization phase and the data writing phase, the second reset transistor is turned on under control of the second scan signal from the second scan signal line and transmits the second initialization voltage signal from the second initialization voltage signal line to the second electrode of the second light-emitting control transistor.

In some embodiments, the first operating level period is within the second operating level period, a start time of the first operating level period and a start time of the second operating level period are spaced apart, and an end time of the first operating level period and an end time of the second operating level period are spaced apart. Alternatively, the second operating level period is within the first operating level period, the start time of the first operating level period and the start time of the second operating level period are spaced apart, and the end time of the first operating level period and the end time of the second operating level period are spaced apart.

In some embodiments, an amplitude of the first pulse width modulation signal is the same as an amplitude of the second pulse width modulation signal, a frequency of the first pulse width modulation signal is the same as a frequency of the second pulse width modulation signal, and a duty cycle of the first pulse width modulation signal is the same as a duty cycle of the second pulse width modulation signal; and a start time of the first operating level period is earlier than a start time of the second operating level period, and an end time of the first operating level period is earlier than an end time of the second operating level period.

In yet another aspect, a display panel is provided, including a plurality of light-emitting devices and the array substrate as described in any of the above embodiments. The plurality of light-emitting devices are disposed on the array substrate, and each light-emitting device is electrically connected to a pixel circuit.

In yet another aspect, a display apparatus is provided, including a driver circuit board and the above display panel. The driver circuit board is electrically connected to the display panel and is configured to transmit control signals to the display panel.

BRIEF DESCRIPTION OF THE DRAWINGS

In order to describe technical solutions in the present disclosure more clearly, the accompanying drawings to be used in some embodiments of the present disclosure will be introduced briefly. However, the accompanying drawings to be described below are merely drawings of some embodiments of the present disclosure, and a person of ordinary skill in the art can obtain other drawings according to those drawings. In addition, the accompanying drawings in the following description may be regarded as schematic diagrams, but are not limitations on actual sizes of products, actual processes of methods and actual timings of signals involved in the embodiments of the present disclosure.

DESCRIPTION OF THE INVENTION

Figure 1:
FIG. 1 is a structural diagram of a display apparatus, in accordance with some embodiments.

The technical solutions in some embodiments of the present disclosure will be described clearly and completely with reference to the accompanying drawings. However, the described embodiments are merely some but not all embodiments of the present disclosure. All other embodiments obtained by a person of ordinary skill in the art based on embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment," "some embodiments," "exemplary embodiments," "example," "specific example," or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

The terms "first" and "second" are used for descriptive purposes only, and are not to be construed as indicating or implying a relative importance or implicitly indicating a number of indicated technical features. Thus, features defined with "first" and "second" may explicitly or implicitly include one or more of the features. In the description of the embodiments of the present disclosure, the term "multiple", "a plurality of" or "the plurality of" means two or more unless otherwise specified.

The phrase "A and/or B" includes following three combinations: only A, only B, and a combination of A and B.

The phrase "applicable to" or "configured to" as used herein indicates an open and inclusive expression, which does not exclude apparatuses that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values exceeding those stated.

The term such as "parallel," "perpendicular," or "equal" as used herein includes a stated condition and a condition similar to the stated condition. A range of the similar condition is within an acceptable deviation range, and the acceptable deviation range is determined by a person of ordinary skill in the art, considering measurement in question and errors associated with measurement of a particular quantity (i.e., the limitations of a measurement system). For example, the term "parallel" includes absolute parallelism and approximate parallelism, and an acceptable range of deviation of the approximate parallelism may be, for example, a deviation within 5°; the term "perpendicular" includes absolute perpendicularity and approximate perpendicularity, and an acceptable range of deviation of the approximate perpendicularity may also be, for example, a deviation within 5°; and the term "equal" includes absolute equality and approximate equality, and an acceptable range of deviation of the approximate equality may be, for example, that a difference between two equals is less than or equal to 5% of either of the two equals.

It will be understood that, when a layer or element is referred to as being on another layer or substrate, it may be that the layer or element is directly on the another layer or substrate, or it may be that intervening layer(s) exist between the layer or element and the another layer or substrate.

Exemplary embodiments are described herein with reference to sectional views and/or plan views that are schematic illustrations of idealized embodiments. In the accompanying drawings, thicknesses of layers and sizes of regions are enlarged for clarity. Variations in shape with respect to the accompanying drawings due to, for example, manufacturing technologies and/or tolerances may be envisaged. Therefore, the exemplary embodiments should not be construed as being limited to the shapes of the regions shown herein, but including shape deviations due to, for example, manufacturing. For example, an etched region shown to have a rectangular shape generally has a feature of being curved. Therefore, the regions shown in the accompanying drawings are schematic in nature, and their shapes are not intended to show actual shapes of the regions in a device, and are not intended to limit the scope of the exemplary embodiments.

Referring to FIG. 1, some embodiments of the present disclosure provide a display apparatus 1000. The display apparatus 1000 may be any apparatus that displays an image whether in motion (e.g., a video) or stationary (e.g., a still image), and whether textual or graphical.

For example, the display apparatus 1000 may be any product or component having a display function, such as a television, a laptop computer, a tablet computer, a mobile phone, a personal digital assistant (PDA), a navigator, a wearable device, an augmented reality (AR) device, a virtual reality (VR) device, a vehicle-mounted display, a flight display, etc. For example, as shown in FIG. 1, the display apparatus 1000 may be a mobile phone.

From the perspective of the light-emitting type of the display apparatus 1000, the display apparatus 1000 may be an organic light-emitting diode (OLED) display apparatus, or a quantum dot light-emitting diode (QLED) display apparatus, or a mini/micro light-emitting diode (MLED) display apparatus. From the perspective of the form of the display apparatus 1000, the display apparatus 1000 may be a flat display apparatus, a curved display apparatus, or a foldable display apparatus. From the perspective of the shape of the display apparatus 1000, the display apparatus 1000 may be rectangular or circular. Some embodiments of the present disclosure are schematically described below by taking an example in which the display apparatus is a rectangular and flat OLED display apparatus. However, the embodiments of the present disclosure are not limited thereto, and any other display apparatuses can also be considered as long as the same technical concept is applied.

Figure 2:
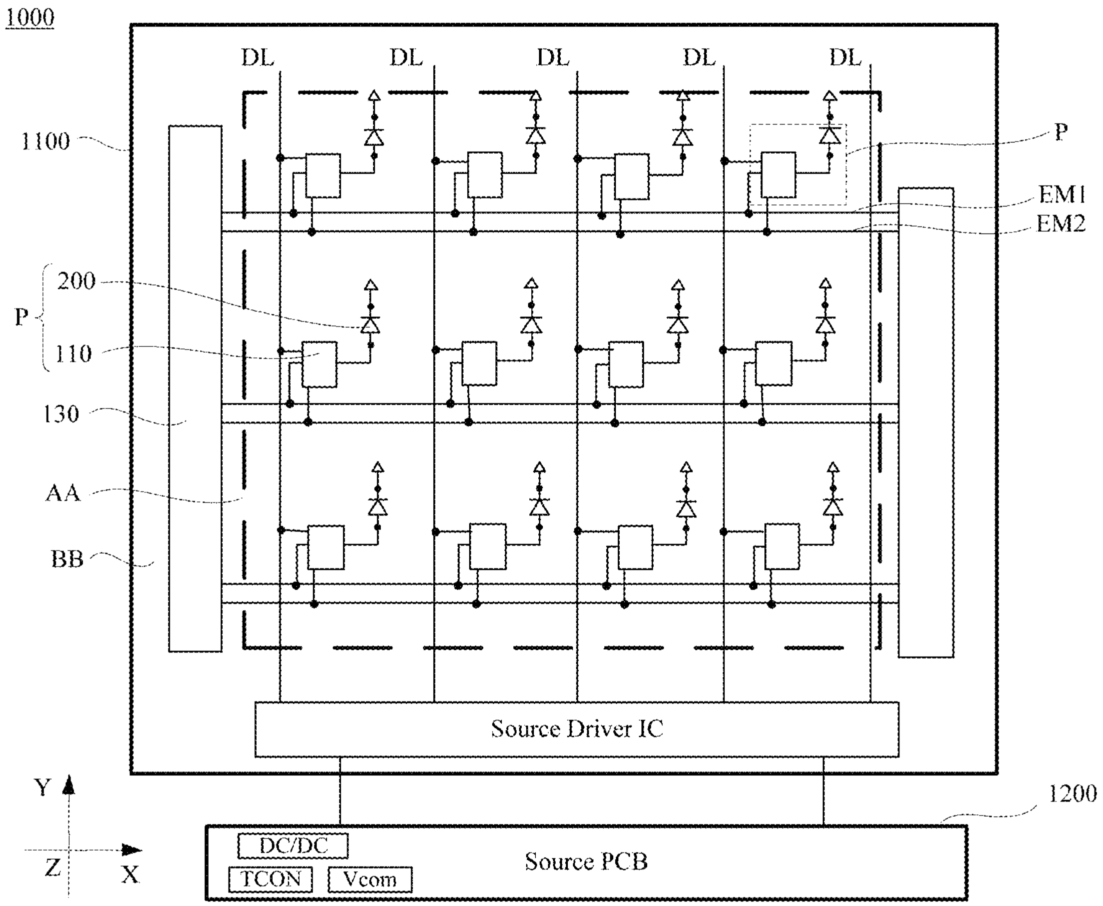
FIG. 2 is a structural diagram of a display panel, in accordance with some embodiments.

In some embodiments, referring to FIG. 2, the display apparatus 1000 includes a display panel 1100 and a driver circuit board 1200. The driver circuit board 1200 may include, for example, a timing controller (TCON), a power management chip DC/DC, an adjustable resistor divider circuit (generating Vcom) and other driving circuits. The driver circuit board 1200 may also include other circuit structures, which are not listed here one by one. The driver circuit board 1200 is electrically connected to the display panel 1100, and is configured to transmit control signals to the display panel 1100, thereby driving the display panel 1100 to display images. The control signals may include clock signals, power supply voltage signals, data signals, etc., which are not listed here one by one.

In addition, the display apparatus 1000 may further include an under-screen camera, an under-screen fingerprint recognition sensor, and the like, so that the display apparatus 1000 is capable of implementing various functions such as photographing, video recording, fingerprint recognition, or face recognition, which will not be specifically limited here.

Referring to FIG. 2, the display panel 1100 has a display region AA and a peripheral region BB, and the peripheral region BB is disposed on at least one side of the display region AA. For example, the peripheral region BB is arranged around the display region AA. The display region AA is a region of the display panel 1100 for displaying images. The display region AA is provided therein with a plurality of sub-pixels P. The sub-pixels P are the smallest light-emitting units in the display panel 1100, and the sub-pixels P are used for displaying images.

The plurality of sub-pixels P may emit light of the same color, such as white light or blue light. Based on this, the display panel further includes a color filter layer disposed on a display side. That is, the display panel adopts a color filter layer on encapsulation film (i.e., CF on Encapsulation (COE)) structure. Alternatively, the plurality of sub-pixels P may emit light of different colors. For example, the plurality of sub-pixels P include red sub-pixels emitting red light, green sub-pixels emitting green light, and blue sub-pixels emitting blue light. For example, the plurality of sub-pixels P may be divided into a plurality of pixel units, each pixel unit includes one red sub-pixel, one blue sub-pixel, and one green sub-pixel (or two green sub-pixels).

Figure 3:
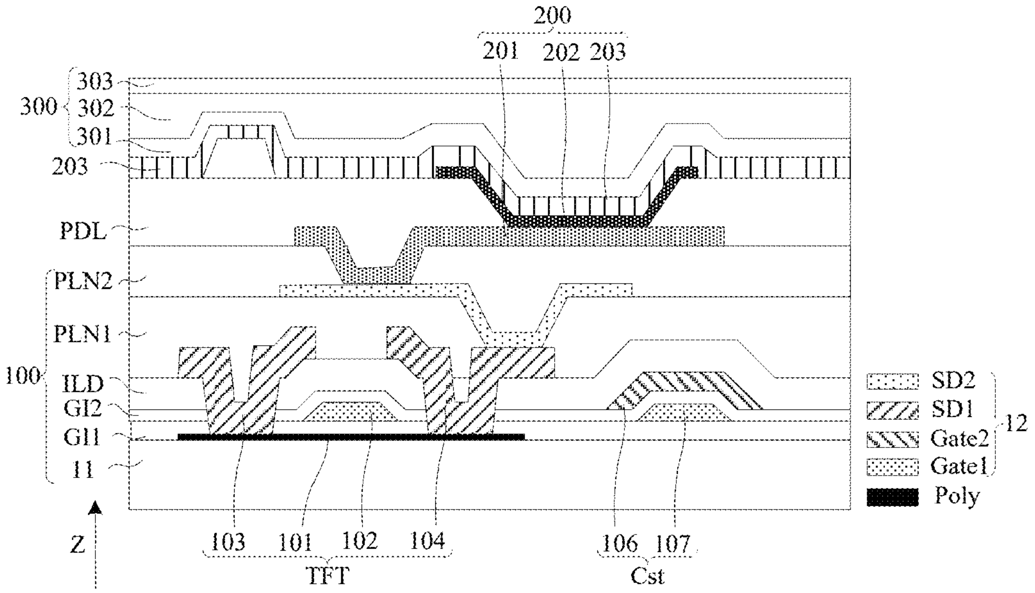
FIG. 3 is a sectional view showing a structure of a display panel, in accordance with some embodiments.

Referring to FIG. 3, the display panel 1100 includes an array substrate 100, a plurality of light-emitting devices 200 and an encapsulation layer 300 that are stacked. Of course, the display panel 1100 may also include a functional stacked layer disposed on a side of the encapsulation layer 300 away from the array substrate 100. The functional stacked layer may be, for example, one or more of a touch functional layer, an anti-reflection layer, a harden layer, a color film layer (the display panel adopts the COE structure) and an anti-fingerprint layer, so that the display panel 1100 can achieve corresponding functions. The type and quantity of the above-mentioned functional stacked layer will not be specifically limited in the embodiments of the present disclosure.

With continued reference to FIG. 3, the array substrate 100 may include a substrate 11, a semiconductor layer Poly disposed on the substrate 11, and a plurality of conductive layers 12 disposed on a side of the semiconductor layer Poly away from the substrate 11. In some embodiments, as shown in FIG. 3, the plurality of conductive layers 12 include a first gate conductive layer Gate1, a second gate conductive layer Gate2, a first source-drain conductive layer SD1, and a second source-drain conductive layer SD2 that are stacked in sequence in a direction Z away from the substrate 11. The array substrate 100 further includes an insulating layer located between any two adjacent conductive layers. For example, the array substrate further includes a first gate insulating layer GI1, a second gate insulating layer GI2, an interlayer dielectric layer ILD, a first planarization layer PLN1 and a second planarization layer PLN2. Of course, the array substrate 100 may also include other conductive layers or insulating layers, which are not listed here one by one.

With continued reference to FIG. 3, the light-emitting device 200 may include, for example, an anode 201, a light-emitting functional layer 202, and a cathode 203 that are stacked. The display panel 1100 may further include a pixel definition layer PDL. The pixel definition layer PDL is disposed on a side of the anode 201 away from the array substrate 100, and includes a plurality of openings. Each light-emitting device 200 is partially located in an opening.

The encapsulation layer 300 is configured to reduce a risk of water vapor and oxygen in an external environment entering the light-emitting devices 200, thereby increasing the service life of the display panel 1100. The encapsulation layer 300 may be an encapsulation film or an encapsulation substrate. For example, as shown in FIG. 3, the encapsulation layer 300 may include a first inorganic encapsulation layer 301, an organic encapsulation layer 302 and a second inorganic encapsulation layer 303 that are stacked in sequence.

As shown in FIG. 2, the array substrate 100 has a display region AA and a peripheral region BB, and the peripheral region BB is disposed around the display region AA. The display region AA of the array substrate 100 and the display region AA of the display panel 1100 are the same region, and the peripheral region BB of the array substrate 100 and the peripheral region BB of the display panel 1100 are the same region.

The array substrate 100 includes a plurality of pixel circuits 110. The plurality of pixel circuits 110 are disposed in the display region AA, and are arranged in a plurality of rows and a plurality of columns in the display region AA. The plurality of rows of pixel circuits 110 are arranged in a first direction Y, and each row includes multiple pixel circuits 110 arranged in a second direction X. The plurality of columns of pixel circuits 110 are arranged in the second direction X, and each column includes multiple pixel circuits 110 arranged in the first direction Y. That is, the first direction Y is a column direction in which the plurality of pixel circuits 110 are arranged, and the second direction X is a row direction in which the plurality of pixel circuits 110 are arranged. The first direction Y and the second direction X intersect. For example, the first direction Y and the second direction X are perpendicular to each other.

The pixel circuit 110 includes a plurality of thin film transistors (TFTs) and at least one capacitor Cst. For example, the pixel circuit 110 may be a "7T1C" circuit or an "8T1C" circuit. Here, "T" refers to a TFT, a number preceding "T" refers to the number of TFTs, "C" refers to a capacitor Cst, and a number preceding "C" refers to the number of capacitors Cst. The following embodiments of the present disclosure will be schematically described by taking an example in which the pixel circuit 110 is the "7T1C" circuit. However, the implementations of the present disclosure are not limited thereto, and any other pixel circuit 110 may also be considered as long as the same technical concept is applied.

The TFTs may be P-type transistors or N-type transistors. The P-type transistor is turned on due to a low level, and is turned off due to a high level. The N-type transistor is turned on due to due to a high level, and is turned off due to a low level. The embodiments of the present disclosure are described by taking P-type transistors as an example. A first electrode of each TFT used in the pixel circuit is one of a source and a drain of the TFT, and a second electrode of the TFT is the other one of the source and the drain of the TFT. For example, the first electrode of the TFT is the source, and the second electrode of the TFT is the drain.

Figure 4:
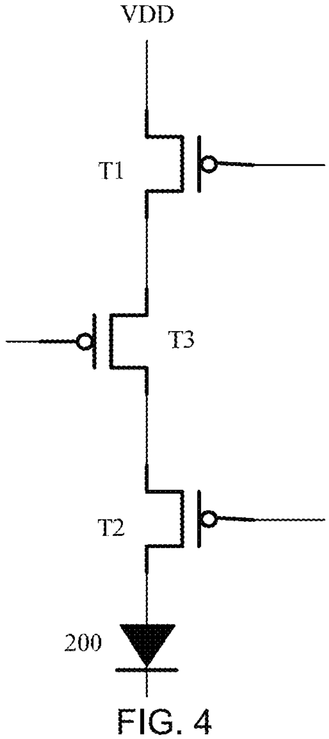
FIG. 4 is a structural diagram of a pixel circuit, in accordance with some embodiments.

In some embodiments, as shown in FIG. 4, the plurality of TFTs may include a driving transistor T3, a first light-emitting control transistor T1, and a second light-emitting control transistor T2. A first electrode of the first light-emitting control transistor T1 is electrically connected to a first voltage signal line VDD, and a second electrode of the first light-emitting control transistor T1 is electrically connected to a first electrode of the driving transistor T3. A first electrode of the second light-emitting control transistor T2 is electrically connected to a second electrode of the driving transistor T3, and a second electrode of the second light-emitting control transistor T2 is electrically connected to a light-emitting device 200. In a light-emitting phase of a display frame, in a case where the first light-emitting control transistor T1 and the second light-emitting control transistor T2 are turned on at the same time, a driving current generated by the driving transistor T3 may flow to the light-emitting device 200 to drive the light-emitting device 200 to emit light.

Figure 5:
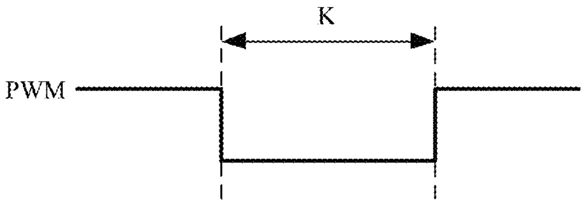
FIG. 5 is a diagram showing a PWM signal in the related art.

In the related art, the first light-emitting control transistor T1 and the second light-emitting control transistor T2 of the same pixel circuit are electrically connected to the same light-emitting control signal line, so that the first light-emitting control transistor T1 and the second light-emitting control transistor T2 are turned on or off at the same time. When the pixel circuit adopts PWM dimming, the PWM dimming adjusts turn-on time of the first light-emitting control transistor T1 and the second light-emitting control transistor T2 in the light-emitting phase to adjust light-emitting time of the light-emitting device, so as to achieves the purpose of adjusting the luminance of the light-emitting device. As shown in FIG. 5, duration of an operating level K of the PWM signal is generally an even multiple of horizontal scanning time (1 H), and 1 H may generally be in a range of 2 μs to 20 μs. The PWM dimming is subject to the duration of the operating level K, resulting in a low accuracy. It will be understood that the operating level refers to a voltage which causes the first light-emitting control transistor T1 and the second light-emitting control transistor T2 to be turned on. In the case where the first light-emitting control transistor T1 and the second light-emitting control transistor T2 are P-type transistors, the operating level is a low-level voltage.

Figure 6:
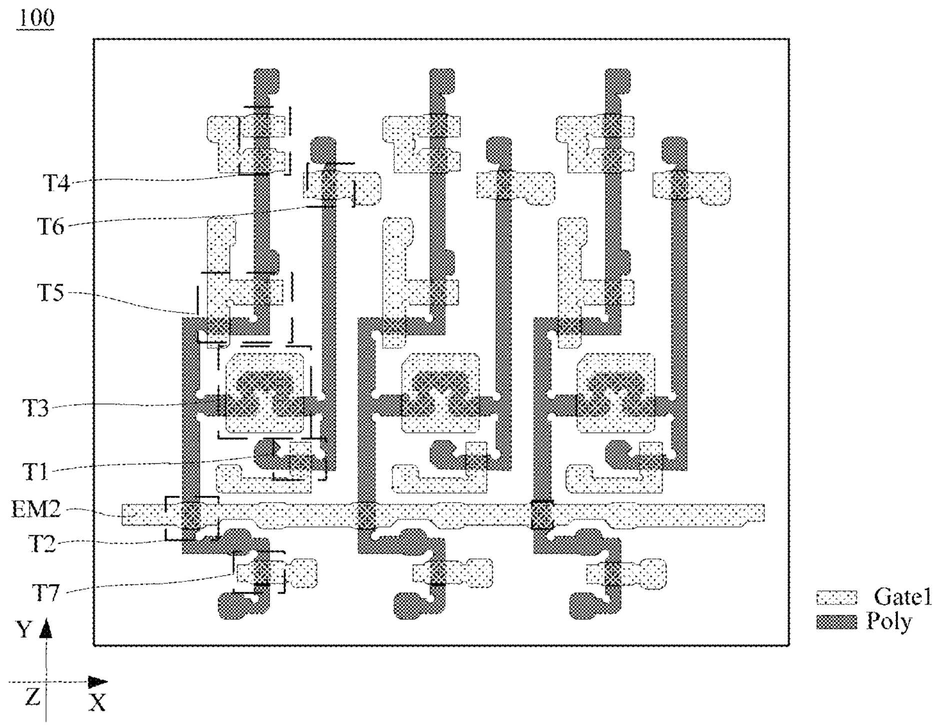
FIG. 6 is a structural diagram of an array substrate, in accordance with some embodiments.
Figure 7:
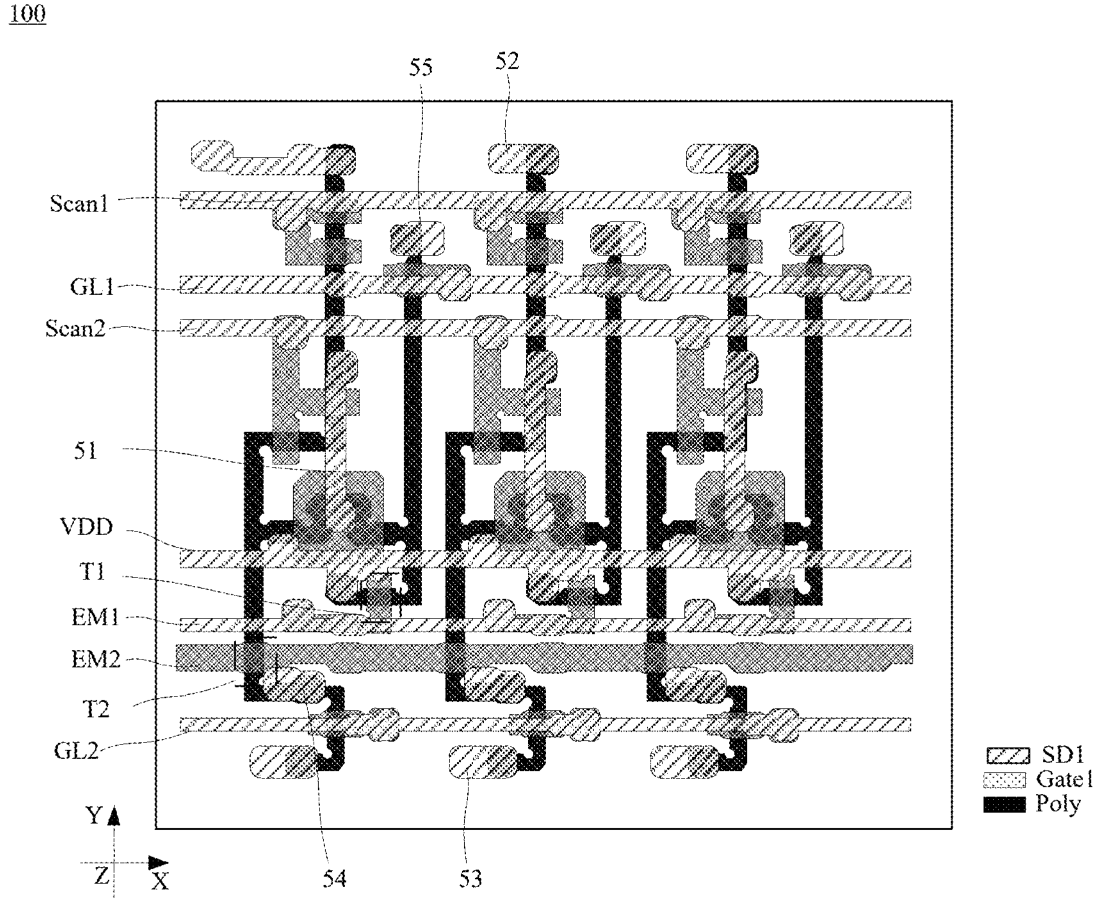
FIG. 7 is a structural diagram of another array substrate, in accordance with some embodiments.

In order to solve the above technical problem, referring to FIGS. 6 and 7, the embodiments of the present disclosure provide an array substrate 100, which includes a first light-emitting control transistor T1 and a second light-emitting control transistor T2. The array substrate 100 further includes a first light-emitting control signal line EM1 and a second light-emitting control signal line EM2. FIG. 7 is a diagram showing a stacked structure of a semiconductor layer Poly, a first gate conductive layer Gate1 and a first source-drain conductive layer SD1 in an array substrate.

The first light-emitting control signal line EM1 is electrically connected to a gate of the first light-emitting control transistor T1, the second light-emitting control signal line EM2 is electrically connected to a gate of the second light-emitting control transistor T2, and the first light-emitting control signal line EM1 and the second light-emitting control signal line EM2 are electrically insulated. In this way, the first light-emitting control transistor T1 and the second light-emitting control transistor T2 are independently controlled by the first light-emitting control signal line EM1 and the second light-emitting control signal line EM2, respectively. The method of controlling the first light-emitting control transistor T1 and the second light-emitting control transistor T2 is more flexible, which is conducive to improving the accuracy of the PWM dimming for the pixel circuit 110.

Figure 8:
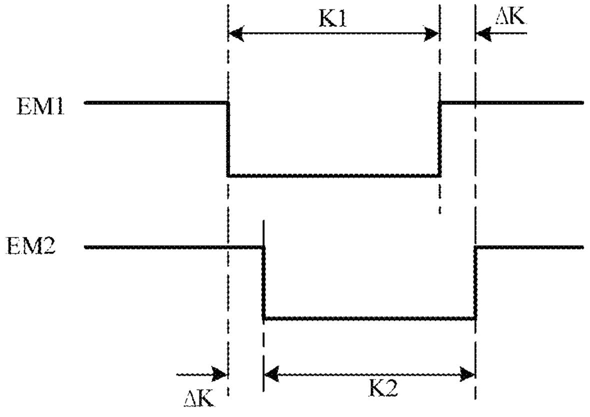
FIG. 8 is a control timing diagram of a first light-emitting control signal line and a second light-emitting control signal line, in accordance with some embodiments.

For example, as shown in FIG. 8, the first light-emitting control signal line EM1 and the second light-emitting control signal line EM2 are used to transmit two different PWM signals respectively, and the two PWM signals have different start times and different end times (i.e., have a certain phase difference). For example, as shown in FIG. 8, low levels of the two PWM signals transmitted by the first light-emitting control signal line EM1 and the second light-emitting control signal line EM2 have equal duration W, and start times of the low levels may differ by an arbitrary value ΔK. Based on this, a duration in which the low levels of the two PWM signals overlap may be an arbitrary value, which is conducive to improving the accuracy of the PWM dimming. The specific method of controlling the pixel circuit 110 will be described below. The start and end times of the signal refers to a time when the signal starts and a time when the signal ends (finishes).

The first light-emitting control signal line EM1 and the second light-emitting control signal line EM2 are located in different conductive layers 12, which is conducive to reducing spacing between the first light-emitting control signal line EM1 and the second light-emitting control signal line EM2 in the first direction Y, reducing the space occupied by the pixel circuit 110, and improving Pixels Per Inch (PPI) of the display panel 1100. Orthographic projections, on the substrate 11, of the first light-emitting control signal line EM1 and the second light-emitting control signal line EM2 do not overlap, which may avoid the parasitic capacitance created between the first light-emitting control signal line EM1 and the second light-emitting control signal line EM2, which is conducive to reducing the risk of signal interference between the first light-emitting control signal line EM1 and the second light-emitting control signal line EM2.

Of course, in some other embodiments, without considering the space occupied by the pixel circuit 110, the first light-emitting control signal line EM1 and the second light-emitting control signal line EM2 may be located in the same conductive layer. In this case, there is a need to ensure that the spacing between the first light-emitting control signal line EM1 and the second light-emitting control signal line EM2 is sufficient to avoid interference between the signals transmitted by the first light-emitting control signal line EM1 and the second light-emitting control signal line EM2.

Figure 9:
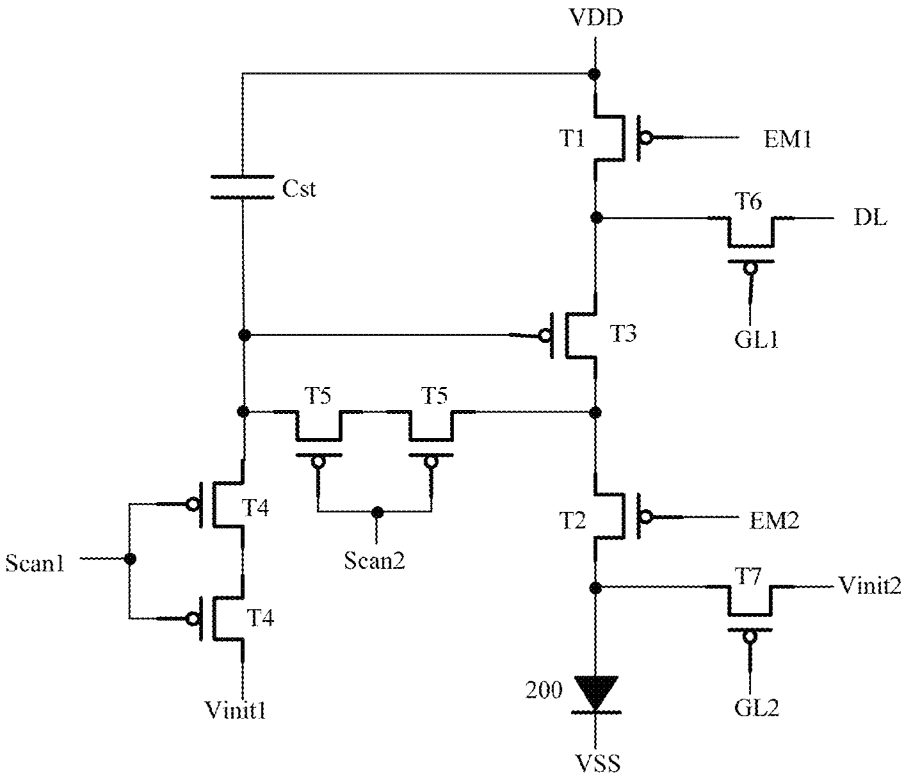
FIG. 9 is a structural diagram of another pixel circuit, in accordance with some embodiments.

In some examples, referring to FIG. 9, the pixel circuit 110 further includes a driving transistor T3, a first reset transistor T4, a compensation transistor T5, a data writing transistor T6, a second reset transistor T7, and a capacitor Cst.

As shown in FIG. 9, a gate of the first reset transistor T4 is electrically connected to a first enable signal line Scan1, a first electrode of the first reset transistor T4 is electrically connected to a first initialization voltage signal line Vinit1, and a second electrode of the first reset transistor T4 is electrically connected to a gate of the driving transistor T3. A gate of the compensation transistor T5 is electrically connected to a second enable signal line Scan2, a first electrode of the compensation transistor T5 is electrically connected to a second electrode of the driving transistor T3, and a second electrode of the compensation transistor T5 is electrically connected to a gate of the driving transistor T3. A gate of the data writing transistor T6 is electrically connected to a first scan signal line GL1, a first electrode of the data writing transistor T6 is electrically connected to a data line DL, and a second electrode of the data writing transistor T6 is electrically connected to a first electrode of the driving transistor T3. A gate of the second reset transistor T7 is electrically connected to a second scan signal line GL2, a first electrode of the second reset transistor T7 is electrically connected to a second initialization voltage signal line Vinit2, and a second electrode of the second reset transistor T7 is electrically connected to the second electrode of the second light-emitting control transistor T2 (an anode of the light-emitting device 200). A plate of the capacitor Cst is electrically connected to the first voltage signal line VDD, and another plate of the capacitor Cst is electrically connected to the gate of the driving transistor T3.

Compared with scan signals (e.g., a first scan signal transmitted by the first scan signal line and a second scan signal transmitted by the second scan signal line), pulse widths of enable signals (e.g., a first enable signal transmitted by the first enable signal line Scan1 and a second enable signal transmitted by the second enable signal line Scan2) are larger. Therefore, the first reset transistor T4 and the compensation transistor T5 are controlled by the enable signals, which is conducive to fully writing a signal into a corresponding node and facilitates the timing adjustment of the pixel circuit 110. For example, the pulse width of the first enable signal transmitted by the first enable signal line Scan1 is relatively large, which is conducive to fully writing a first initialization voltage signal from the first initialization voltage signal line Vinit1 into the gate of the driving transistor T3.

In some embodiments, the second enable signal line Scan2 and the first scan signal line GL1 are insulated from each other, and they are configured to transmit different voltage signals. In this way, the data writing transistor T6 and the compensation transistor T5 are controlled by different signal lines, and the control timing of the data writing transistor T6 and the control timing of the compensation transistor T5 are more flexible, which is conducive to improving the control accuracy of the pixel circuit 110 (see below).

Figure 10:
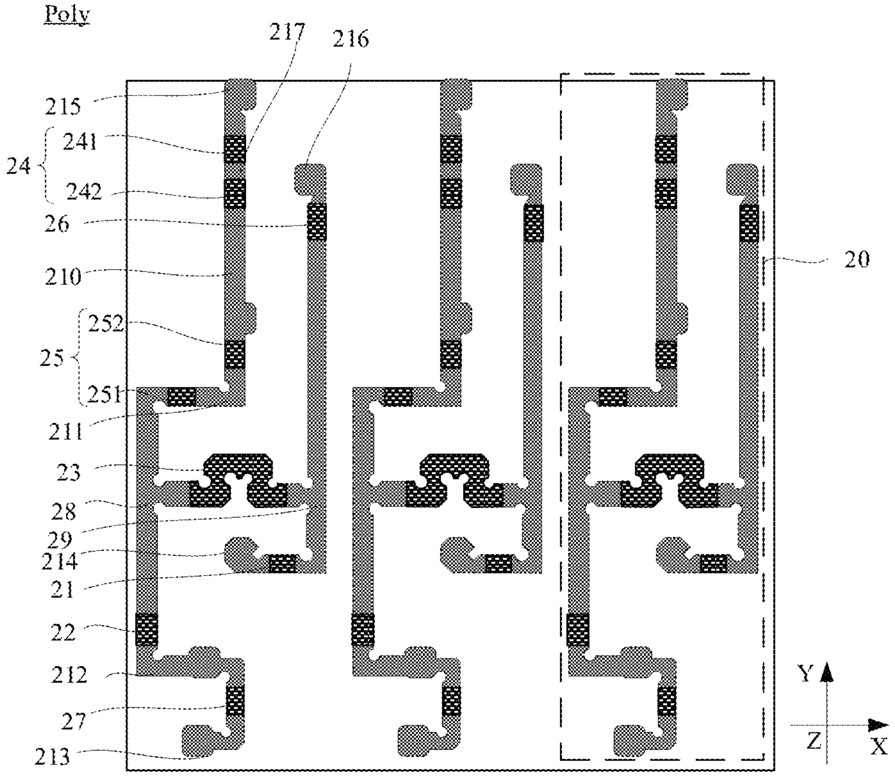
FIG. 10 is a structural diagram of a semiconductor layer, in accordance with some embodiments.

As shown in FIG. 10, the semiconductor layer Poly includes a plurality of semiconductor patterns 20, and each semiconductor pattern 20 is used to constitute a pixel circuit 110. In other words, the pixel circuit 110 includes a semiconductor pattern 20. It will be noted that, in FIG. 10, the semiconductor layer Poly uses different filling shapes to distinguish different regions of the semiconductor pattern 20, and the semiconductor pattern 20 is a continuous one-piece structure.

Figure 11:
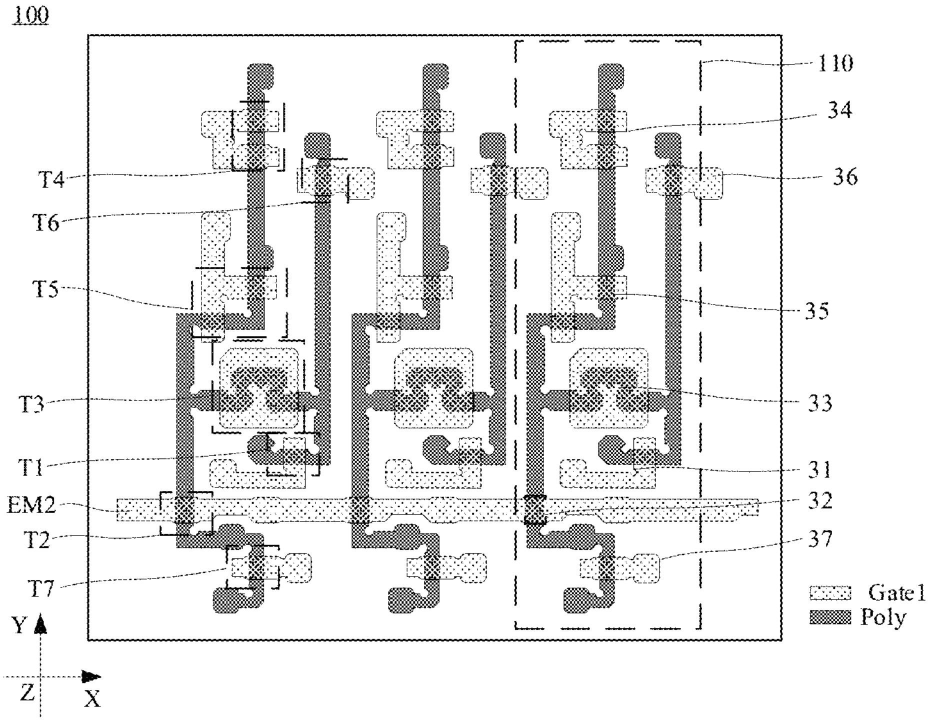
FIG. 11 is a diagram showing a stacked structure of a semiconductor layer and a light-shielding layer, in accordance with some other embodiments.

With reference to FIGS. 10 and 11, the semiconductor pattern 20 may include a first channel region 21 of the first light-emitting control transistor T1, a second channel region 22 of the second light-emitting control transistor T2, a third channel region 23 of the driving transistor T3, a fourth channel region 24 of the first reset transistor T4, a fifth channel region 25 of the compensation transistor T5, a sixth channel region 26 of the data writing transistor T6, a seventh channel region 27 of the second reset transistor T7, a first connection region 28, a second connection region 29, a third connection region 210, a fourth connection region 211, and a fifth connection region 212.

The first channel region 21 is used to form a channel structure of the first light-emitting control transistor T1, and the second channel region 22 is used to form a channel structure of the second light-emitting control transistor T2. The first channel region 21 and the second channel region 22 are staggered in the first direction Y. In other words, the first channel region 21 and the second channel region 22 are spaced apart in the first direction Y, which facilitates the wiring arrangement of the first light-emitting control signal line EM1 and the second light-emitting control signal line EM2.

The first connection region 28 and the second connection region 29 are respectively located on two opposite sides of the third channel region 23 (in the second direction X). The first connection region 28 is connected to the third channel region 23 and the second channel region 22, so that the first electrode of the second light-emitting control transistor T2 is electrically connected to the second electrode of the driving transistor T3. The first connection region 28 may form the second electrode of the driving transistor T3 and the first electrode of the second light-emitting control transistor T2. As shown in FIG. 10, the first connection region 28 is further electrically connected to the fifth channel region 25 of the compensation transistor T5, and forms the first electrode of the compensation transistor T5.

In the first direction Y, the fourth channel region 24 and the fifth channel region 25 are staggered, and the fifth channel region 25 and the sixth channel region 26 are staggered, so that the first enable signal line Scan1, the second enable signal line Scan2 and the first scan signal line GL1 are arranged at intervals in the first direction Y, which facilitates the spatial arrangement of the first enable signal line Scan1, the second enable signal line Scan2 and the first scan signal line GL1.

The second connection region 29 is connected to the third channel region 23 and the first channel region 21, so that the second electrode of the first light-emitting control transistor T1 is electrically connected to the first electrode of the driving transistor T3. In other words, the second connection region 29 may form the first electrode of the driving transistor T3 and the second electrode of the first light-emitting control transistor T1. As shown in FIG. 10, the second connection region 29 is further electrically connected to the sixth channel region 26 of the data writing transistor T6, and forms the second electrode of the data writing transistor T6.

The fourth channel region 24 of the first reset transistor T4 and the fifth channel region 25 of the compensation transistor T5 are connected via the third connection region 210. The third connection region 210 electrically connects the second electrode of the first reset transistor T4 to the second electrode of the compensation transistor T5. In other words, the third connection region 210 forms the second electrode of the first reset transistor T4 and the second electrode of the compensation transistor T5.

The second channel region 22 of the second light-emitting control transistor T2 and the seventh channel region 27 of the second reset transistor T7 are connected via the fifth connection region 212, and the fifth connection region 212 electrically connects the second electrode of the second light-emitting control transistor T2 to the second electrode of the second reset transistor T7. That is, the fifth connection region 212 forms the second electrode of the second light-emitting control transistor T2 and the second electrode of the second reset transistor T7.

In some embodiments, with continued reference to FIGS. 10 and 11, the compensation transistor T5 may be a double-gate transistor, which is conducive to reducing the leakage current of the compensation transistor T5, and in turn improving the capability of holding the gate voltage of the driving transistor T3. The fifth channel region 25 includes a first sub-region 251 and a second sub-region 252 that are spaced apart. The fourth connection region 211 is located between the first sub-region 251 and the second sub-region 252, and is used for connecting the first sub-region 251 and the second sub-region 252.

The semiconductor pattern 20 may further include a sixth connection region 213, a seventh connection region 214, an eighth connection region 215, and a ninth connection region 216. The sixth connection region 213 is located on a side of the seventh channel region 27 away from the fifth connection region 212, is connected to the seventh channel region 27, is used for forming the first electrode of the second reset transistor T7, and is configured to be electrically connected to the second initialization voltage signal line (not shown in the figure).

The seventh connection region 214 is located on a side of the first channel region 21 away from the second connection region 29, and is connected to the first channel region 21. The seventh connection region 214 is used for forming the first electrode of the first light-emitting control transistor T1, and is electrically connected to the first voltage signal line (not shown in the figure). The eighth connection region 215 is located on a side of the fourth channel region 24 away from the third connection region 210, and is connected to the fourth channel region 24. The eighth connection region 215 is used for forming the first electrode of the first reset transistor T4, and is electrically connected to the first initialization voltage signal line (not shown in the figure). The ninth connection region 216 is located on a side of the sixth channel region 26 away from the second connection region 29, and is connected to the sixth channel region 26. The ninth connection region 216 is used for forming the first electrode of the data writing transistor T6, and is electrically connected to the data line (not shown in the figure).

In some embodiments, with continued reference to FIG. 10, the first reset transistor T4 may be a double-gate transistor, which is conducive to reducing the leakage current of the first reset transistor T4, and in turn improving the capability of holding the gate voltage of the driving transistor T3. The fourth channel region 24 includes a third sub-region 241 and a fourth sub-region 242 that are spaced apart. The semiconductor layer Poly further includes a tenth connection region 217. The tenth connection region 217 is located between the third sub-region 241 and the fourth sub-region 242, and is used for connecting the third sub-region 241 and the fourth sub-region 242.

Figure 12:
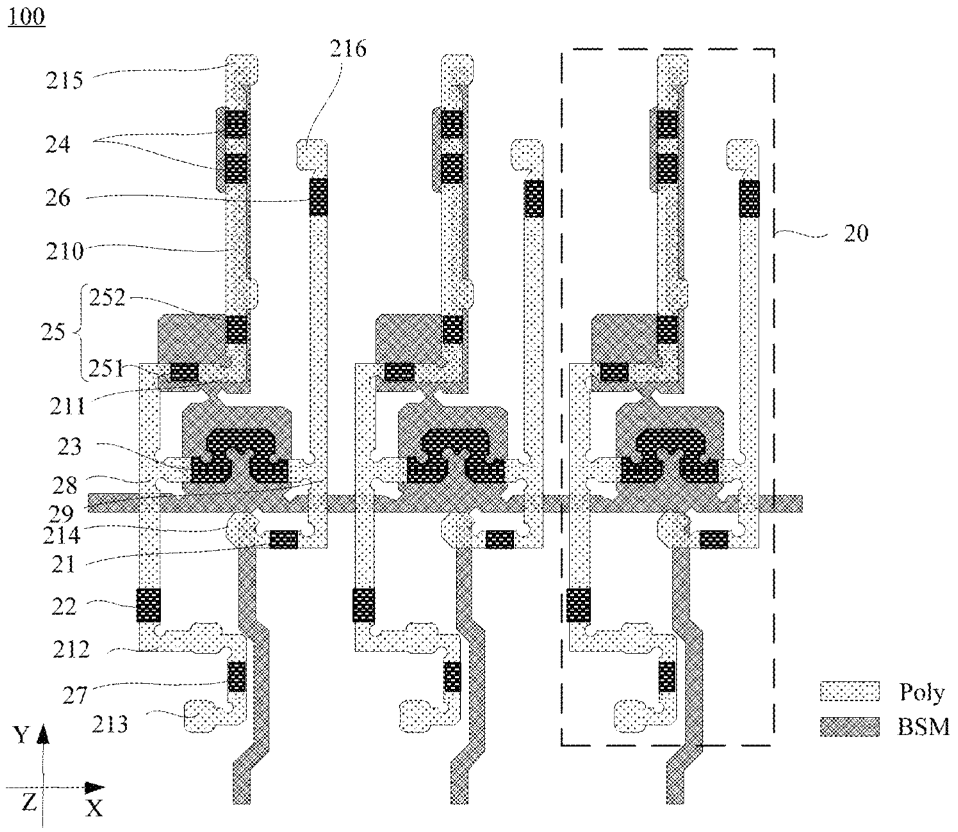
FIG. 12 is a diagram showing a stacked structure of a semiconductor layer and a first gate conductive layer, in accordance with some other embodiments.

In some embodiments, referring to FIG. 12, the array substrate 100 further includes a light-shielding layer BSM. The light-shielding layer BSM is disposed between the substrate 11 and the pixel circuit 110. An orthographic projection of the light-shielding layer BSM on the substrate 11 at least partially overlaps with an orthographic projection of the pixel circuit 110 on the substrate.

For example, the light-shielding layer BSM is disposed between the substrate 11 and the semiconductor layer Poly, and the orthographic projection of the light-shielding layer BSM on the substrate 11 partially overlaps with an orthographic projection of the semiconductor layer Poly on the substrate 11. For example, as shown in FIG. 12, orthographic projections, on the substrate 11, of the third channel region 23, the fourth channel region 24 and the fifth channel region 25 of the semiconductor pattern 20 are located within the orthographic projection of the light-shielding layer BSM on the substrate 11.

In some embodiments, referring to FIG. 11, the first gate conductive layer Gate1 is disposed on a side of the semiconductor layer Poly away from the substrate 11, and the first gate conductive layer Gate1 includes first gate patterns 31, second light-emitting control signal lines EM2, third gate patterns 33, fourth gate patterns 34, fifth gate patterns 35, sixth gate patterns 36 and seventh gate patterns 37.

Referring to FIGS. 10 and 11, an orthographic projection of the first gate pattern 31 on the substrate 11 partially overlaps with an orthographic projection of the first channel region 21 on the substrate 11. For example, the orthographic projection of the first gate pattern 31 on the substrate 11 covers the orthographic projection of the first channel region 21 on the substrate 11, and the first gate pattern 31 is used for forming the gate of the first light-emitting control transistor T1. In addition, the orthographic projection of the first gate pattern 31 on the substrate 11 does not overlap with an orthographic projection of the first connection region 28 on the substrate 11, thereby avoiding that a transistor is developed between the first gate pattern 31 and the first connection region 28.

An orthographic projection of the second light-emitting control signal line EM2 on the substrate 11 partially overlaps with an orthographic projection of the second channel region 22 on the substrate 11. For example, the second light-emitting control signal line EM2 includes a second gate pattern 32, an orthographic projection of the second gate pattern 32 on the substrate 11 coincides with the orthographic projection of the second channel region 22 on the substrate 11, and the second gate pattern 32 is used for forming the gate of the second light-emitting control transistor T2. That is, the second light-emitting control signal line EM2 is used for transmitting a second pulse width modulation signal, and is further used for forming the gate of the second light-emitting control transistor T2.

Referring to FIGS. 10 and 11, an orthographic projection of the third gate pattern 33 on the substrate 11 covers an orthographic projection of the third channel region 23 on the substrate 11, and the third gate pattern 33 is used for forming the gate of the driving transistor T3. Of course, the third gate pattern 33 is also used for forming a plate of the capacitor Cst. An orthographic projection of the fourth gate pattern 34 on the substrate 11 partially overlaps with an orthographic projection of the fourth channel region 24 on the substrate 11, and the fourth gate pattern 34 is used for forming the gate of the first reset transistor T4. For example, the orthographic projection of the fourth gate pattern 34 on the substrate 11 covers the orthographic projection of the fourth channel region 24 on the substrate 11. An orthographic projection of the fifth gate pattern 35 on the substrate 11 partially overlaps with an orthographic projection of the fifth channel portion 25 on the substrate 11, and the fifth gate pattern 35 is used for forming the gate of the compensation transistor T5. For example, the orthographic projection of the fifth gate pattern 35 on the substrate 11 covers the orthographic projection of the fifth channel portion 25 on the substrate 11. An orthographic projection of the sixth gate pattern 36 on the substrate 11 partially overlaps with an orthographic projection of the sixth channel region 26 on the substrate 11, and the sixth gate pattern 36 is used for forming the gate of the data writing transistor T6. For example, the orthographic projection of the sixth gate pattern 36 on the substrate 11 covers the orthographic projection of the sixth channel region 26 on the substrate 11. An orthographic projection of the seventh gate pattern 37 on the substrate 11 partially overlaps with an orthographic projection of the seventh channel portion 27 on the substrate 11, and the seventh gate pattern 37 is used for forming the gate of the second reset transistor T7. For example, the orthographic projection of the seventh gate pattern 37 on the substrate 11 covers the orthographic projection of the seventh channel portion 27 on the substrate 11.

For example, as shown in FIG. 11, the first gate pattern 31, the second light-emitting control signal line EM2, the second gate pattern 32, the third gate pattern 33, the fourth gate pattern 34, the fifth gate pattern 35, the sixth gate pattern 36 and the seventh gate pattern 37 included in the same pixel circuit 110 are staggered in the first direction Y. Therefore, the gate of the first light-emitting control transistor T1, the gate of the second light-emitting control transistor T2, the gate of the driving transistor T3, the gate of the first reset transistor T4, the gate of the compensation transistor T5, the gate of the data writing transistor T6 and the gate of the second reset transistor T7 may be connected to different signal lines respectively, which improves the control accuracy of the pixel circuit 110. In addition, the above-mentioned different signal lines are arranged in the first direction Y, which reduces the risk of signal interference between adjacent signal lines.

Figure 13:
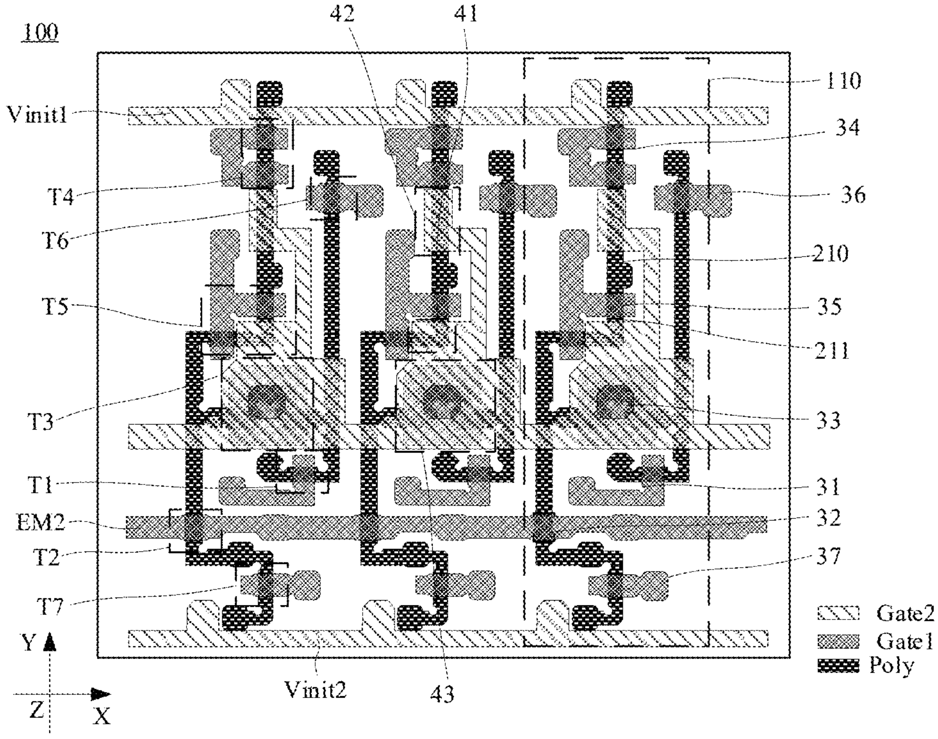
FIG. 13 is a diagram showing a stacked structure of layers from a semiconductor layer to a second gate conductive layer, in accordance with some embodiments.

In some embodiments, as shown in FIG. 13, the second gate conductive layer Gate2 is disposed on a side of the first gate conductive layer Gate1 away from the substrate 11, and includes first initialization voltage signal lines Vinit1, second initialization signal lines Vinit2, first blocking portions 41, second blocking portions 42 and capacitor electrodes 43. The first blocking portion 41, the second blocking portion 42 and the capacitor electrode 43 are connected to form a one-piece structure.

Referring to FIG. 13, an orthographic projection of the capacitor electrode 43 on the substrate 11 at least partially overlaps with the orthographic projection of the third gate pattern 33 on the substrate 11, and the capacitor electrode 43 is used for forming another plate of the capacitor Cst.

Figure 14:
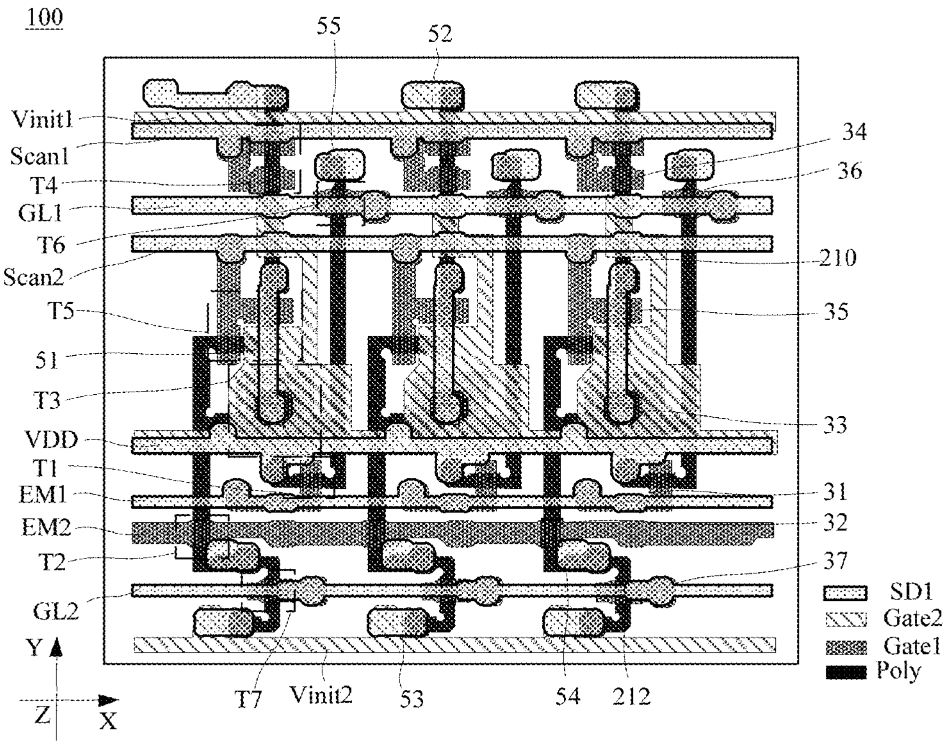
FIG. 14 is a diagram showing a stacked structure of layers from a semiconductor layer to a first source-drain conductive layer, in accordance with some embodiments.

Referring to FIG. 14, the first source-drain conductive layer SD1 is disposed on a side of the second gate conductive layer Gate2 away from the substrate 11, and includes first light-emitting control signal lines EM1, first enable signal lines Scan1, second enable signal lines Scan2, first scan signal lines GL1, second scan signal lines GL2, first voltage signal lines VDD, first transfer blocks 51, second transfer blocks 52, third transfer blocks 53, fourth transfer blocks 54 and fifth transfer blocks 55.

Referring to FIGS. 13 and 14, an orthographic projection of the first light-emitting control signal line EM1 on the substrate 11 partially overlaps with the orthographic projection of the first gate pattern 31 on the substrate 11, and the first light-emitting control signal line EM1 is electrically connected to the first gate pattern 31. During the manufacturing process of the array substrate 100, the semiconductor layer Poly need to be doped using the first gate conductive layer Gate1 as a mask layer. The first light-emitting control signal line EM1 and the first gate pattern 31 are located in different conductive layers 12, and the first light-emitting control signal line EM1 is arranged in the first source-drain conductive layer SD1, which may avoid that the first light-emitting control signal line EM1 blocks the semiconductor layer Poly during the process of the semiconductor layer Poly being doped. Moreover, it is conducive to increasing the spacing between the first light-emitting control signal line EM1 and the semiconductor pattern 20, reducing the parasitic capacitance created between the first light-emitting control signal line EM1 and the semiconductor pattern 20, and in turn reducing the influence of the signal transmitted by the first light-emitting control signal line EM1 on the semiconductor pattern 20.

An orthographic projection of the first enable signal line Scan1 on the substrate 11 partially overlaps with an orthographic projection of the fourth gate pattern 34 on the substrate 11, and the first enable signal line Scan1 is electrically connected to the fourth gate pattern 34. The orthographic projection of the first enable signal line Scan1 on the substrate 11 further partially overlaps with the orthographic projection of the semiconductor layer Poly on the substrate 11. The first enable signal line Scan1 and the fourth gate pattern 34 are arranged in different conductive layers 12, and the first enable signal line Scan1 is arranged in the first source-drain conductive layer SD1, which may avoid that the first enable signal line Scan1 blocks the semiconductor layer Poly during the process of the semiconductor layer Poly being doped. Moreover, it is conducive to increasing the spacing between the first enable signal line Scan1 and the semiconductor pattern 20, reducing the parasitic capacitance created between the first enable signal line Scan1 and the semiconductor pattern 20, and in turn reducing the influence of the signal transmitted by the first enable signal line Scan1 on the semiconductor pattern 20.

An orthographic projection of the second enable signal line Scan2 on the substrate 11 partially overlaps with an orthographic projection of the fifth gate pattern 35 on the substrate 11, and the second enable signal line Scan2 is electrically connected to the fifth gate pattern 35. An orthographic projection of the first scan signal line GL1 on the substrate 11 partially overlaps with an orthographic projection of the sixth gate pattern 36 on the substrate 11, and the first scan signal line GL1 is electrically connected to the sixth gate pattern 36. An orthographic projection of the second scan signal line GL2 on the substrate 11 partially overlaps with an orthographic projection of the seventh gate pattern 37 on the substrate 11, and the second scan signal line GL2 is electrically connected to the seventh gate pattern 37. Based on the reasons similar to those of the first light-emitting control signal line EM1 and the first enable signal line Scan1, the second enable signal line Scan2, the first scan signal line GL1 and the second scan signal line GL2 are arranged in the first source-drain conductive layer SD1, which may avoid that the second enable signal line Scan2, the first scan signal line GL1 and the second scan signal line GL2 block the semiconductor layer Poly during the process of the semiconductor layer Poly being doped. Moreover, it is conducive to reducing parasitic capacitance created between the second enable signal line Scan2 and the semiconductor pattern 20, parasitic capacitance created between the first scan signal line GL1 and the semiconductor pattern 20, and parasitic capacitance created between the second scan signal line GL2 and the semiconductor pattern 20, and in turn reducing the influence of signals transmitted by the second enable signal line Scan2, the first scan signal line GL1 and the second scan signal line GL2 on the semiconductor pattern 20.

An orthographic projection of the first transfer block 51 on the substrate 11 partially overlaps with an orthographic projection of the third connection region 210 on the substrate 11 and partially overlaps with an orthographic projection of the third gate pattern 33 on the substrate 11; and two ends of the first transfer block 51 are electrically connected to the third connection region 210 and the third gate pattern 33, respectively; therefore, the second electrode of the first reset transistor T4 and the second electrode of the compensation transistor T5 are electrically connected to the gate of the driving transistor T3.

Referring to FIGS. 13 and 14, an orthographic projection of the second transfer block 52 on the substrate 11 partially overlaps with orthographic projections, on the substrate 11, of the first initialization voltage signal line Vinit1 and the eighth connection region (the first electrode of the first reset transistor T4); and the second transfer block 52 is electrically connected to the first initialization voltage signal line Vinit1 and the eighth connection region; therefore, the first initialization voltage signal line Vinit1 is electrically connected to the first electrode of the first reset transistor T4.

An orthographic projection of the third transfer block 53 on the substrate 11 partially overlaps with orthographic projections, on the substrate 11, of the second initialization voltage signal line Vinit2 and the sixth connection region (the first electrode of the second reset transistor T7); and the third transfer block 53 is electrically connected to the second initialization voltage signal line Vinit2 and the sixth connection region; therefore, the second initialization voltage signal line Vinit2 is electrically connected to the first electrode of the second reset transistor T7.

An orthographic projection of the fourth transfer block 54 on the substrate 11 partially overlaps with an orthographic projection of the fifth connection region on the substrate 11; and the fourth transfer block 54 is electrically connected to the fifth connection region 212; therefore, the fourth transfer block 54 is electrically connected to the second electrode of the second light-emitting control transistor T2 and the second electrode of the second reset transistor T7. The fourth transfer block 54 is further used to be electrically connected to the light-emitting device.

An orthographic projection of the fifth transfer block 55 on the substrate 11 partially overlaps with an orthographic projection of the ninth connection region 216 on the substrate 11. The fifth transfer block 55 is electrically connected to the ninth connection region 216, and the fifth transfer block 55 is electrically connected to the first electrode of the data writing transistor T6. The fifth transfer block 55 is further used to be electrically connected to the data line.

Referring to FIGS. 13 and 14, an orthographic projection of the first blocking portion 41 on the substrate 11 at least partially overlaps with an orthographic projection of the fourth connection region 211 on the substrate 11. For example, the orthographic projection of the first blocking portion 41 on the substrate 11 covers the orthographic projection of the fourth connection region 211 on the substrate 11. The first blocking portion 41 is used to block signal interference of a signal line in an upper layer (a signal line on a side of the second gate conductive layer Gate2 away from the substrate 11) to the fourth connection region 211.

Figure 15:
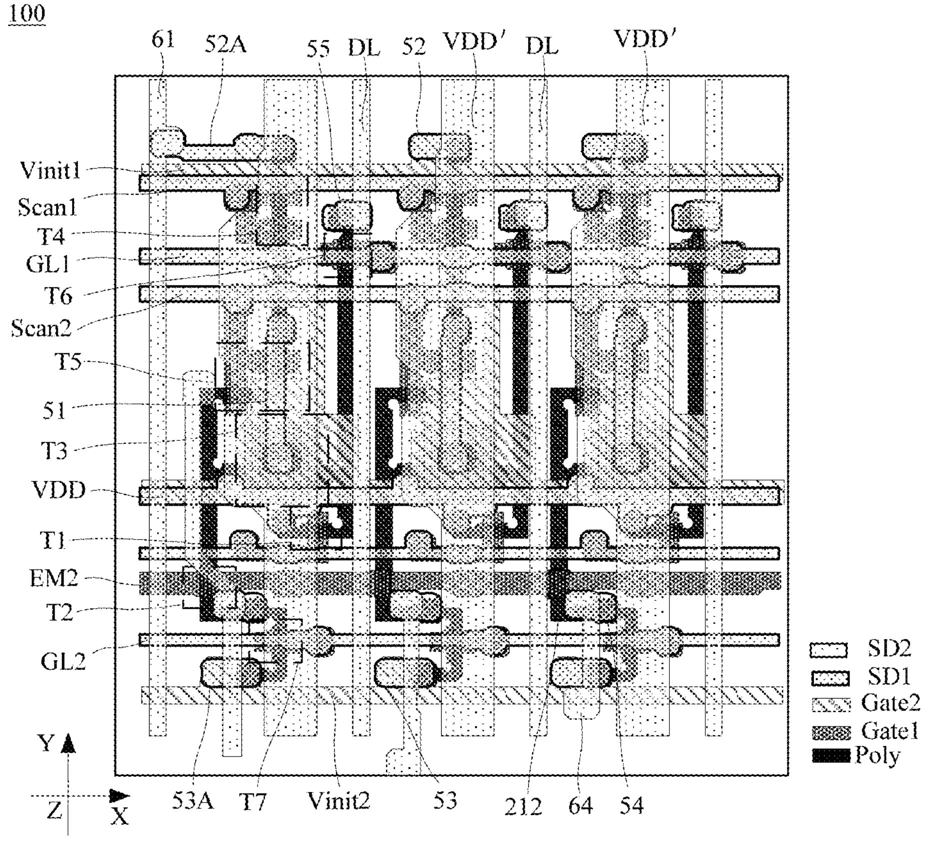
FIG. 15 is a diagram showing a stacked structure of layers from a semiconductor layer to a second source-drain conductive layer, in accordance with some embodiments.
Figure 16A:
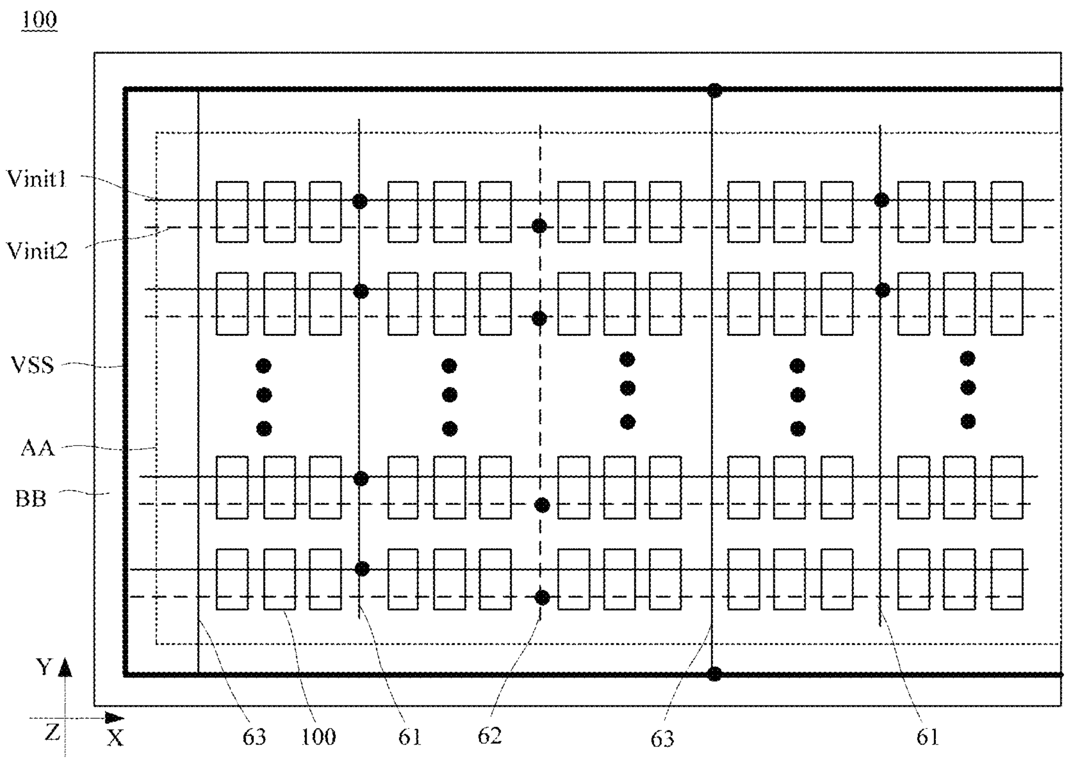
FIG. 16A is a schematic diagram of an array substrate, in accordance with some embodiments.
Figure 16B:
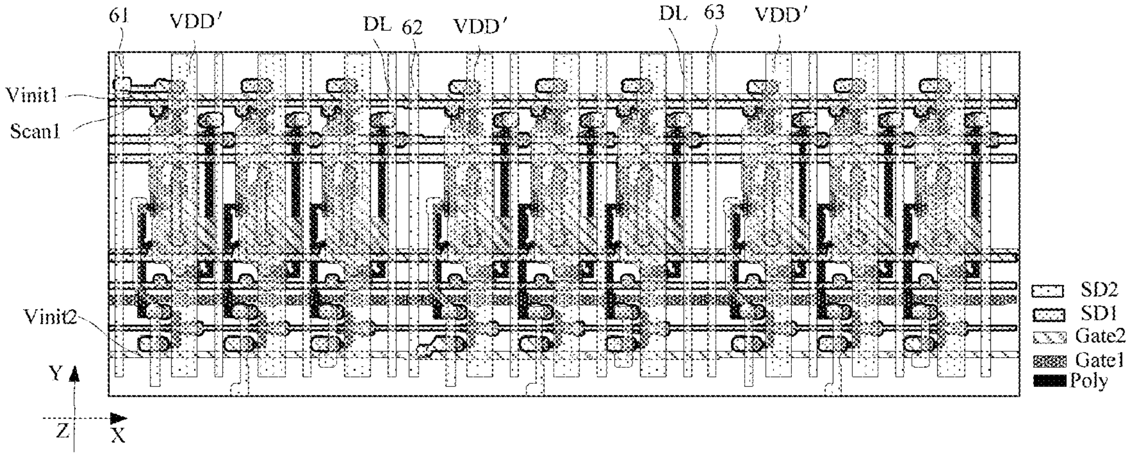
FIG. 16B is a structural diagram of an array substrate, in accordance with some embodiments.

An orthographic projection of the second blocking portion 42 on the substrate 11 partially overlaps with an orthographic projection of the third connection region 210 on the substrate 11. For example, the orthographic projection of the second blocking portion 42 on the substrate 11 covers the orthographic projection of the third connection region 210 on the substrate 11. The orthographic projection of the second blocking portion 42 on the substrate 11 further partially overlaps with orthographic projections, on the substrate 11, of the first scan signal line GL1 and the second enable signal line Scan2. The second blocking portion 42 may reduce the signal interference of the first scan signal line GL1 and the second enable signal line Scan2 on the third connection region 210. In some embodiments, referring to FIGS. 15, 16A and 16B, the array substrate 100 further includes a second source-drain conductive layer SD2. The second source-drain conductive layer SD2 is disposed on a side of the first source-drain conductive layer SD1 away from the substrate 11, and includes a plurality of data lines DL extending in the first direction Y, a plurality of first voltage signal connection lines VDD' extending in the first direction Y, a plurality of first connection lines 61 extending in the first direction Y, a plurality of second connection lines 62 extending in the first direction Y, and a plurality of third connection lines 63 extending in the first direction Y. FIG. 16A is a simplified view of an array substrate, which is used to more clearly show connections of the plurality of first connection lines 61, the plurality of second connection lines 62, the plurality of third connection lines 63, the first initialization voltage signal lines Vinit1, the plurality of second initialization voltage signal lines Vinit2, and a second voltage signal bus VSS. FIG. 16B is a structural diagram of a region where nine adjacent pixel circuits in a row are located in an array substrate.

Each data line DL of the plurality of data lines DL is electrically connected to a column of pixel circuits 110. Each first voltage signal connection line VDD' of the plurality of first voltage signal connection lines VDD' is electrically connected to the plurality of first voltage signal lines VDD in the first source-drain conductive layer SD1, so that the plurality of first voltage signal lines VDD are connected to constitute a mesh structure, which reduce the resistance of the plurality of first voltage signal lines VDD. For example, as shown in FIG. 15, the plurality of data lines DL and the plurality of first voltage signal connection lines VDD' are alternately arranged in the second direction X.

As shown in FIGS. 16A and 16B, the plurality of columns of pixel circuits 110 may be divided into a plurality of groups; each group includes multiple columns of pixel circuits 110; and multiple pixel circuits 110 in the same row in a single group correspond to multiple sub-pixels in a single pixel unit, respectively. Considering an example in which a single pixel unit includes one red sub-pixel, one blue sub-pixel and one green sub-pixel, a single group includes three columns of pixel circuits 110, and three pixel circuits in the same row in the single group respectively correspond to the red sub-pixel, the blue sub-pixel and the green sub-pixel in the single pixel unit.

A first connection line 61, a second connection line 62 and a third connection line 63 are each disposed between two adjacent groups of pixel circuits 110, and only one of the first connection line 61, the second connection line 62 and the third connection line 63 is disposed between each two adjacent groups of pixel circuits 110. In the embodiments of the present disclosure, the arrangement order and arrangement density of the first connection lines 61, the second connection lines 62, and the third connection lines 63 are not specifically limited. For example, the first connection lines 61, the second connection lines 62, and the third connection lines 63 are periodically arranged in the second direction.

Each first connection line 61 is electrically connected to the plurality of first initialization voltage signal lines Vinit1, so that the plurality of first initialization voltage signal lines Vinit1 are connected to constitute a mesh structure, which reduces the resistance of the plurality of first initialization voltage signal lines Vinit1. Each second connection line 62 is electrically connected to the plurality of second initialization voltage signal lines Vinit2, so that the plurality of second initialization voltage signal lines Vinit2 are connected to constitute a mesh structure, which reduces the resistance of the plurality of second initialization voltage signal lines Vinit2.

The peripheral region BB further includes the second voltage signal bus VSS. The second voltage signal bus VSS is used to be electrically connected to cathode layers. Two ends of each third connection line 63 extend to the peripheral region BB and are electrically connected to the second voltage signal bus VSS. The third connection line 63 is connected in parallel with the cathode layer, which is conducive to reducing the resistance of the cathode layer.

Figure 17:
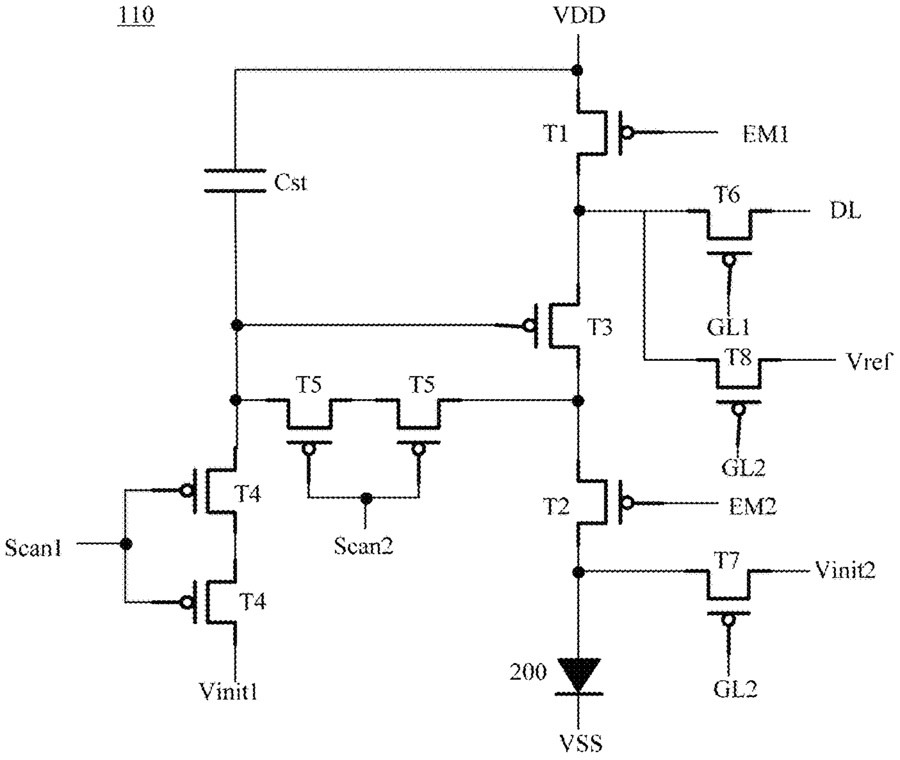
FIG. 17 is a structural diagram of yet another pixel circuit, in accordance with some embodiments.
Figure 18:
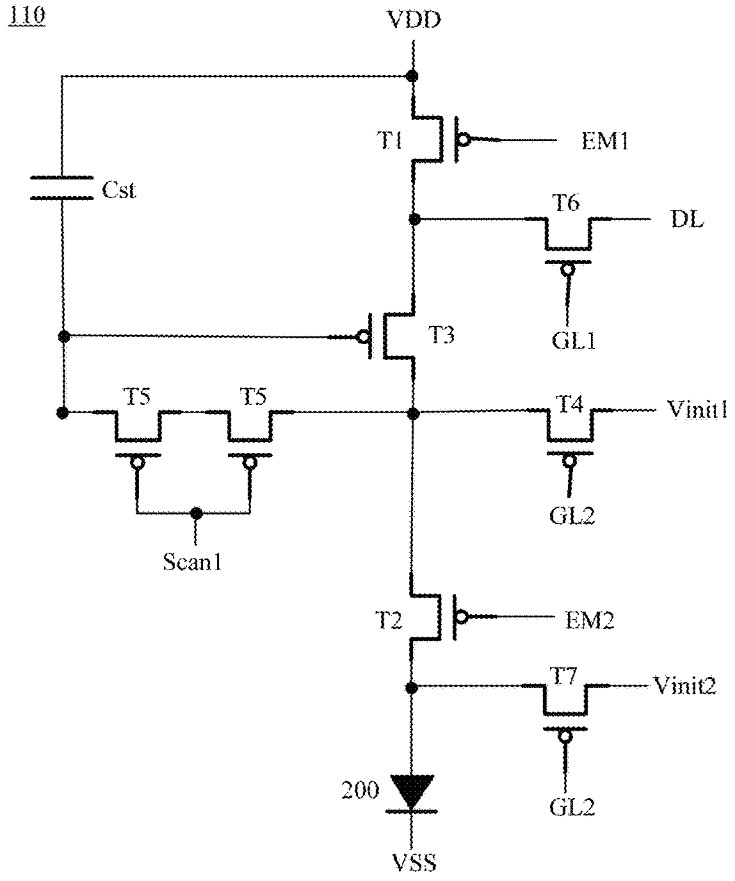
FIG. 18 is a structural diagram of yet another pixel circuit, in accordance with some embodiments.

For example, as shown in FIG. 15, a plurality of second transfer blocks 52 include second target transfer block(s) 52A. An orthographic projection of the second target transfer block 52A on the substrate partially overlaps with an orthographic projection of the first connection line 61 on the substrate, and the second target transfer block 52A is electrically connected to the first connection line 61. As described above, the second transfer block 52 is further electrically connected to the first initialization voltage signal line Vinit1 and the first electrode of the first reset transistor (the eighth connection region). Based on this, the second target transfer block 52A may electrically connect the first connection line 61 to the first initialization voltage signal line Vinit1, so that the first connection line 61 is connected to the first initialization voltage signal line Vinit1 to constitute a mesh structure. It will be understood that the specific structure of the pixel circuit 110 may also adopt other structures of pixel circuits. For example, as shown in FIG. 17, the pixel circuit 110 may further include a readjusting transistor T8, a gate of the readjusting transistor T8 is electrically connected to the second scan signal line GL2, a first electrode of the readjusting transistor T8 is electrically connected to a reference voltage signal line Vref, and a second electrode of the readjusting transistor T8 is electrically connected to the first electrode of the driving transistor T3. Alternatively, as shown in FIG. 18, the second electrode of the compensation transistor T5 may be electrically connected to the second electrode of the driving transistor T3. The structure of the pixel circuit 110 is not specifically limited in the embodiments of the present disclosure as long as the same technical concept is applied.

In some embodiments, the second source-drain conductive layer SD2 further includes a plurality of seventh transfer blocks 64, and the seventh transfer block 64 is used for connecting the pixel circuit 110 and the light-emitting device 200. As shown in FIG. 15, the plurality of seventh transfer blocks 64 may have different shapes, so as to be connected to light-emitting devices 200 at different positions. An orthographic projection of the seventh transfer block 64 on the substrate 11 partially overlaps with the orthographic projection of the fourth transfer block 54 on the substrate 11. The seventh transfer block 64 is electrically connected to the fourth transfer block 54, and is further electrically connected to the drain of the second light-emitting control transistor T2 of the pixel circuit. The seventh transfer block 64 is further used to be electrically connected to the anode of the light-emitting device. Therefore, the light-emitting device is electrically connected to the pixel circuit.

Figure 19:
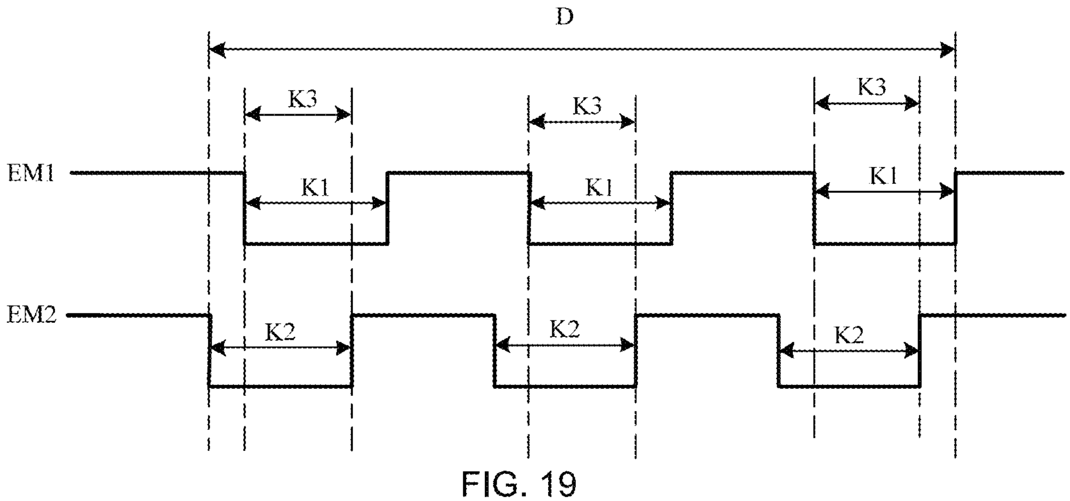
FIG. 19 is a control timing diagram of a first light-emitting control signal line and a second light-emitting control signal line, in accordance with some other embodiments.

Referring to FIG. 19, some embodiments of the present disclosure provide a method for driving a pixel driving circuit 110, which is used for driving the pixel circuit 110 as described in any of the above embodiments. The following embodiments of the present disclosure will be described below by taking an example in which the pixel circuit 110 is the pixel circuit 110 shown in FIG. 9. The method can also be used in other pixel circuits (e.g., the pixel circuits shown in FIGS. 17 and 18) as long as the same technical concept is applied.

The first light-emitting control signal line EM1 is configured to transmit a first pulse width modulation signal PWM1, and the second light-emitting control signal line EM2 is configured to transmit a second pulse width modulation signal PWM2.

A display cycle includes a blank phase B and a light-emitting phase D. As shown in FIG. 19, the method includes as follows.

In the light-emitting phase D, the first pulse width modulation signal PWM1 has a first operating level period K1, and the second pulse width modulation signal PWM2 has a second operating level period K2. The first operating level period K1 means a period in which the first pulse width modulation signal PWM1 drives the first light-emitting control transistor T1 to be turned on, and the second operating level period K2 means a period in which the second pulse width modulation signal PWM2 drives the second light-emitting control transistor T2 to be turned on.

The first operating level period K1 is different from the second operating level period K2. For example, a start time (start moment) of the first operating level period K1 is different from a start time of the second operating level period K2, and/or an end time (end moment) of the first operating level period K1 is different from an end time of the second operating level period K2. In this way, the control flexibility of the first light-emitting control transistor T1 and the second light-emitting control transistor T2 may be increased, which is conducive to improving the accuracy of the PWM dimming of the pixel circuit 110.

The first operating level period K1 partially overlaps with the second operating level period K2. When the first operating level period K1 overlaps with the second operating level period K2, the first light-emitting control transistor T1 and the second light-emitting control transistor T2 are turned on simultaneously, and the driving current generated by the driving transistor T3 may be transmitted to the light-emitting device 200 to drive the light-emitting device to emit light. In the embodiments of the present disclosure, by controlling the start time of the first operating level period K1 and the start time of the second operating level period K2, the duration in which the first operating level period K1 overlaps with the second operating level period K2 is controlled, and then the dimming accuracy of the pixel circuit 110 is improved.

In some embodiments, a period in which the first operating level period K1 overlaps with the second operating level period K2 is a light-emitting period K3, a duration of the first operating level period K1 is greater than a duration of the light-emitting period K3, and a duration of the second operating level period K2 is greater than a duration of the light-emitting period K3. In this way, a minimum light-emitting duration of each light-emitting phase in the PWM dimming may be reduced, thereby reducing a total light-emitting duration of the light-emitting device in a single display cycle, which is conducive to improving the dimming accuracy of the pixel circuit 110.

In some embodiments, referring to FIG. 19, an amplitude (voltage values of high and low levels), frequency and duty cycle of the first pulse width modulation signal PWM1 are the same as an amplitude, frequency and duty cycle of the second pulse width modulation signal PWM2, respectively. In this way, it is conducive to reducing the difficulty of controlling the first pulse width modulation signal PWM1 and the second pulse width modulation signal PWM2.

The array substrate further includes shift register(s) located in the peripheral region BB, and the shift register includes a plurality of shift register circuits in cascade. The first light-emitting control signal lines EM1 and the second light-emitting control signal lines EM2 may be electrically connected to the same shift register, or may be electrically connected to different shift registers.

For example, when at least one of amplitudes, frequencies and duty cycles of the first pulse width modulation signal PWM1 and the second pulse width modulation signal PWM2 are different, the first light-emitting control signal lines EM1 and the second light-emitting control signal lines EM2 are respectively electrically connected to two different shift registers.

For example, when the first pulse width modulation signal PWM1 and the second pulse width modulation signal PWM2 have the same amplitude, same frequency and same duty cycle, the first light-emitting control signal lines EM1 and the second light-emitting control signal lines EM2 may be electrically connected to the same shift register or may be electrically connected to different shift registers.

Figure 20:
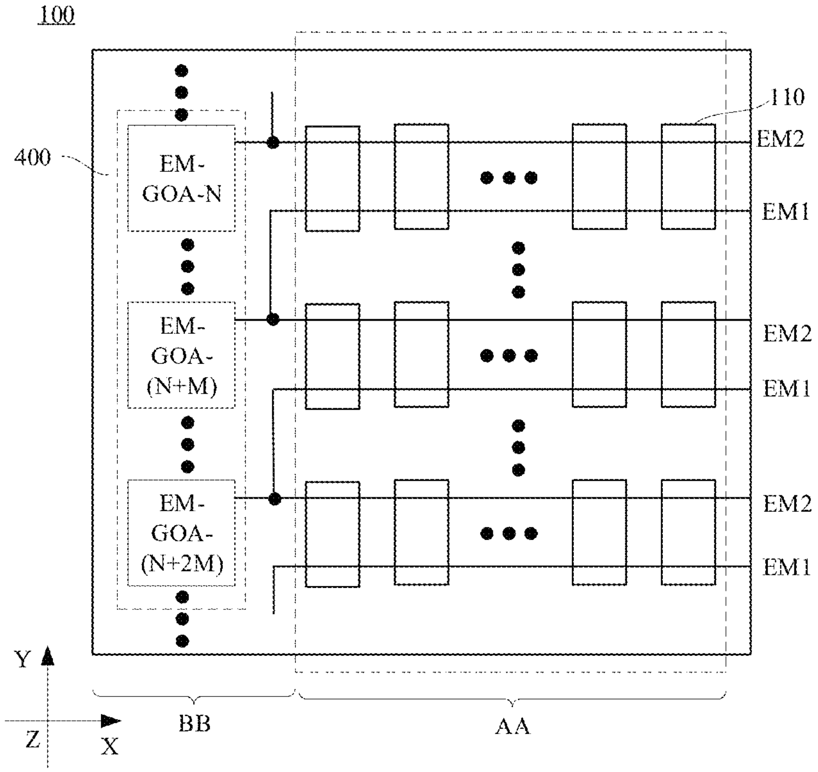
FIG. 20 is a diagram showing a connection relationship between first light-emitting control signal lines and second light-emitting control signal lines and a first shift register, in accordance with some embodiments.

As shown in FIG. 20, the embodiments of the present disclosure are described by taking an example in which the first light-emitting control signal lines EM1 and the second light-emitting control signal lines EM2 are electrically connected to the same shift register. In this case, it is conducive to simplifying the circuit structure of the array substrate 100, reducing the width of the peripheral region BB, and in turn realizing a narrow bezel of the display panel 1100. In the case where the first light-emitting control signal lines EM1 and the second light-emitting control signal lines EM2 are electrically connected to the same shift register, the first light-emitting control signal line EM1 and the second light-emitting control signal line EM2 that are electrically connected to the same row of pixel circuits 110 are electrically connected to shift register circuits of different stages, respectively.

For example, each row of pixel circuits 110 is electrically connected to one first light-emitting control signal line EM1 and one second light-emitting control signal line EM2. The array substrate 100 includes a first shift register 400, and the first shift register 400 includes a plurality of first shift register circuits EM-GOA that are sequentially connected in cascade.

In the case where the start time of the first operating level period K1 is later than (after) the start time of the second operating level period K2 and the end time of the first operating level period K1 is later than (after) the end time of the second operating level period K2, as shown in FIG. 20, a first light-emitting control signal line EM1 electrically connected to an Nth row of pixel circuits 110 is electrically connected to an Nth-stage first shift register circuit EM-GOA-N; and a second light-emitting control signal line EM2 electrically connected to the Nth row of pixel circuits is electrically connected to an (N+M)th-stage first shift register circuit EM-GOA-(N+M).

Alternatively, in the case where the start time of the first operating level period K1 is earlier than (before) the start time of the second operating level period K2 and the end time of the first operating level period K1 is earlier than (before) the end time of the second operating level period K2, a second light-emitting control signal line EM2 electrically connected to the Nth row of pixel circuits is electrically connected to the Nth-stage first shift register circuit EM-GOA-N; and the first light-emitting control signal line EM1 electrically connected to the Nth row of pixel circuits is electrically connected to the (N+M)th-stage first shift register circuit EM-GOA-(N+M) (not shown in the figure).

The PWM signals output by the Nth-stage first shift register circuit EM-GOA-N and the (N+M)th-stage first shift register circuit EM-GOA-(N+M) have the same amplitude, same frequency and same duty cycle, and a difference between the start times and a difference between the end times are each MH (time for scanning M rows).

In some embodiments, M is less than or equal to 4 ($M \leq 4$). For example, M may be 1, 2, 3 or 4. In this way, it is conducive to reducing the number of first shift register circuits EM-GOA and reducing the space of the peripheral region BB occupied by the first shift register 400. In addition, spacing between the second light-emitting control signal line EM2 and the (N+M)th-stage first shift register circuit EM-GOA-(N+M) in the first direction Y may be reduced, which is conducive to reducing the difficulty of the connection between the second light-emitting control signal line EM2 and the (N+M)th-stage first shift register circuit EM-GOA-(N+M). It will be understood that the value of M in the embodiments of the present disclosure is not limited thereto, and any other reasonable value may be considered, as long as the same technical concept is applied and the driving timing requirements of the pixel circuit are satisfied.

In some embodiments, the first enable signal lines Scan1 and the second enable signal lines Scan2 may be electrically connected to the same shift register, or may be electrically connected to different shift registers.

For example, the first enable signal lines Scan1 and the second enable signal lines Scan2 are electrically connected to different shift registers. Therefore, the timing of the first enable signal line Scan1 and the timing of the second enable signal line Scan2 may be well adjusted, which is conducive to improving the control accuracy of the pixel circuit.

Figure 21:
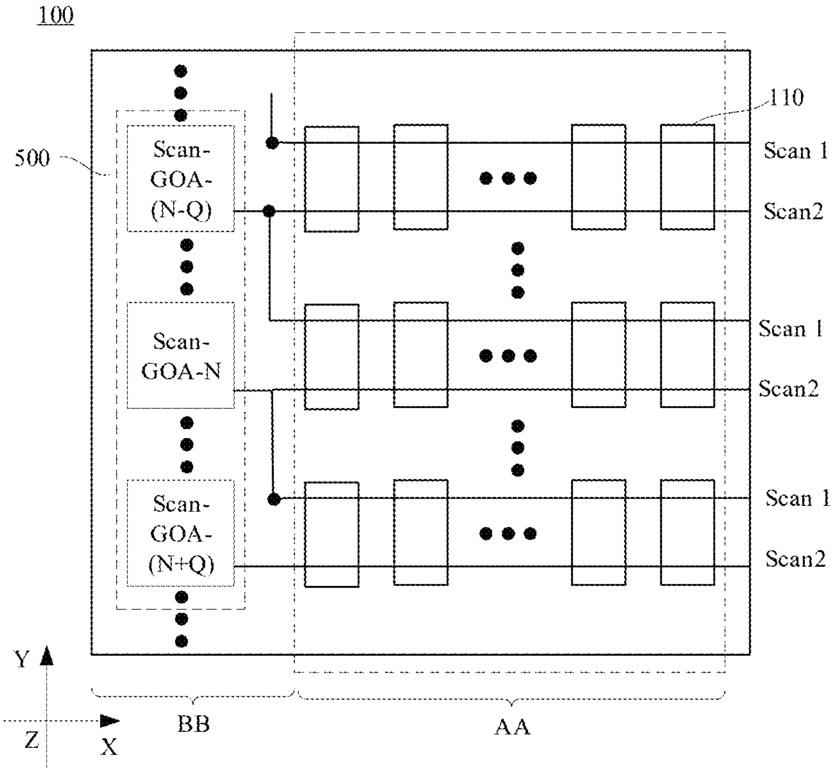
FIG. 21 is a diagram showing a connection relationship between first enable signal lines and second enable signal lines and a second shift register.

For example, as shown in FIG. 21, the first enable signal lines Scan1 and the second enable signal lines Scan2 are electrically connected to the same shift register. In this way, it is conducive to simplifying the circuit structure of the array substrate, reducing the width of the peripheral region BB, and in turn realizing the narrow bezel of the display panel. In the case where the first enable signal lines Scan1 and the second enable signal lines Scan2 are electrically connected to the same shift register, the first enable signal line Scan1 and the second enable signal line Scan2 that are electrically connected to the same row of pixel circuits 110 are electrically connected to shift register circuits of different stages, respectively.

As shown in FIG. 21, the embodiments of the present disclosure are described by taking an the example in which the first enable signal lines Scan1 and the second enable signal lines Scan2 are electrically connected to the same shift register.

For example, each row of pixel circuits 110 is electrically connected to one first enable signal line Scan1 and one second enable signal line Scan2. The array substrate 100 includes a second shift register 500, and the second shift register 500 includes a plurality of second shift register circuits Scan-GOA that are sequentially connected in cascade.

As shown in FIG. 21, a first enable signal line Scan1 electrically connected to the Nth row of pixel circuits 110 is electrically connected to an (N-Q)th-stage second shift register circuit Scan-GOA-(N-Q). A second enable signal line Scan2 electrically connected to the Nth row of pixel circuits 110 is electrically connected to an Nth-stage second shift register circuit Scan-GOA-N.

Alternatively, the first enable signal line Scan1 electrically connected to the Nth row of pixel circuits is electrically connected to the Nth-stage second shift register circuit Scan-GOA-N. The second enable signal line Scan2 electrically connected to the Nth row of pixel circuits 110 is electrically connected to an (N+Q)th-stage second shift register circuit Scan-GOA-(N+Q).

Enable signals output by the Nth-stage second shift register circuit Scan-GOA-N and the (N+Q)th-stage second shift register circuit Scan-GOA-(N+Q) have the same waveform, and have a certain phase difference.

In some embodiments, Q is greater than or equal to 3 and less than or equal to 9 ($3 \le Q \le 9$). For example, Q may be 3, 4, 5, 6, 7, 8, or 9. Thus, it is conducive to reducing the number of the second shift register circuits Scan-GOA and reducing the space of the peripheral region BB occupied by the second shift register 500. In addition, spacing between the second enable signal line Scan2 and the (N+Q)th-stage second shift register circuit Scan-GOA-(N+Q) in the first direction Y may be reduced, which is conducive to reducing the difficulty of the connection between the second enable signal line Scan2 and the (N+Q)th-stage second shift register circuit Scan-GOA-(N+Q). It will be understood that the value of Q in the embodiments of the present disclosure is not limited thereto, and any other reasonable value may be considered, as long as the same technical concept is applied and the driving timing requirements of the pixel circuit are satisfied.

Figure 22:
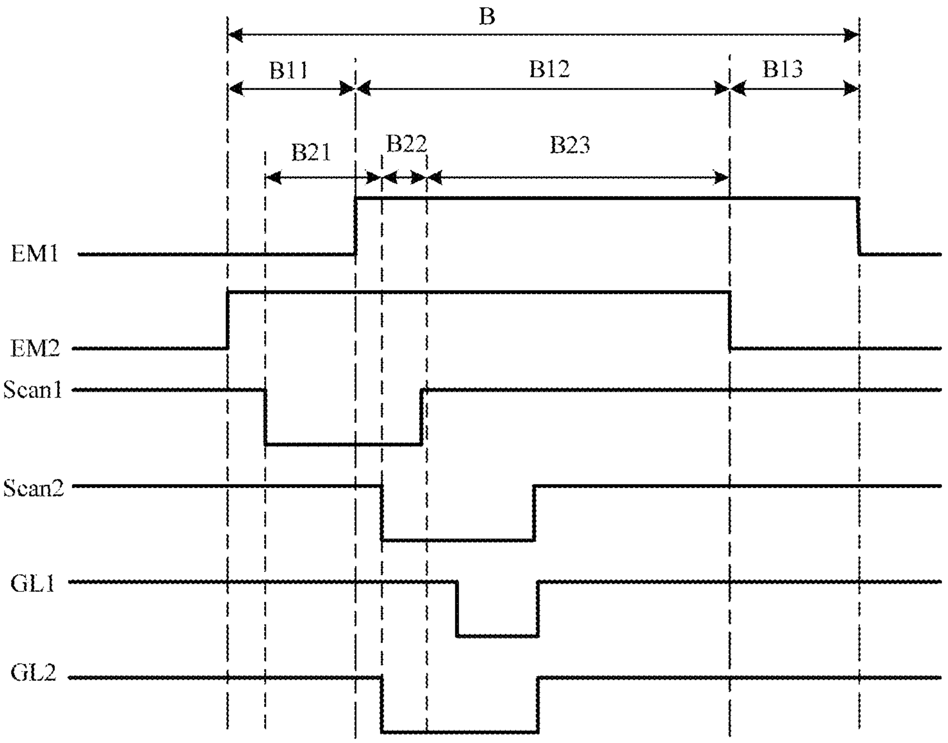
FIG. 22 is a control timing diagram of a pixel circuit, in accordance with some embodiments.

In some embodiments, referring to FIG. 22, in the blank phase B, at least one of the first light-emitting control transistor T1 and the second light-emitting control transistor T2 is turned off (not turned on). In this case, the light-emitting device 200 does not emit light.

For example, the start time of the first operating level period K1 is later than (after) the start time of the second operating level period K2, and the end time of the first operating level period K1 is later than (after) the end time of the second operating level period K2. The blank phase B includes a first sub-phase B11, a second sub-phase B12, and a third sub-phase B13.

In the first sub-phase B11, the first pulse width modulation signal PWM1 transmitted by the first light-emitting control signal line EM1 is at an operating level (a low level), and the second pulse width modulation signal transmitted by the second light-emitting control signal line EM2 is at a turn-off level (a high level); in this case, the first light-emitting control transistor T1 is turned on, and the second light-emitting control transistor T2 is turned off. In the second sub-phase B12, the first pulse width modulation signal PWM1 transmitted by the first light-emitting control signal line EM1 is at a turn-off level, the second pulse width modulation signal PWM2 transmitted by the second light-emitting control signal line EM2 is at a turn-off level, and the first light-emitting control transistor T1 and the second light-emitting control transistor T2 are both turned off. In the third sub-phase B13, the first pulse width modulation signal PWM1 transmitted by the first light-emitting control signal line EM1 is at a turn-off level, and the second pulse width modulation signal is at an operating level; in this case, the first light-emitting control transistor T1 is turned off, and the second light-emitting control transistor T2 is turned on.

In some embodiments, as shown in FIG. 21, the blank phase B includes a first initialization phase B21, a second initialization phase B22, and a data writing phase B23. The method further includes as follows.

In the first initialization phase B21, the first light-emitting control transistor T1 is turned on during at least a part of the first initialization phase B21, and the second light-emitting control transistor T2 is turned off. The first reset transistor T4 is turned on under control of the first enable signal from the first enable signal line Scan1, and transmits the first initialization voltage signal from the first initialization voltage signal line Vinit1 to the gate of the driving transistor T3, so as to initialize the voltage of the gate of the driving transistor T3.

In the second initialization phase B22, the first reset transistor T4 remains on; and the compensation transistor T5 is turned on under control of the second enable signal from the second enable signal line Scan2, and transmits the first initialization voltage signal from the gate of the driving transistor T3 to the second electrode of the driving transistor T3, so as to initialize the voltage of the second electrode of the driving transistor T3.

In the data writing phase B23, the first reset transistor T4 is turned off; the compensation transistor T5 remains on; and the data writing transistor T5 is turned on under control of the first scan signal from the first scan signal line GL1, and transmits the data signal from the data line DL to the first electrode of the driving transistor T3. The data signal sequentially passes through the driving transistor T3 and the compensation transistor T5, so that a compensated data signal (Vdata+Vth) is transmitted to the gate of the driving transistor T3.

A part of the first initialization phase B21 is within the first sub-phase B11, and another part of the first initialization phase B21 is within the second sub-phase B12. The second initialization phase B22 is within the second sub-phase B12, which avoids that the first initialization voltage signal is transmitted to the anode of the light-emitting device 200 and in turn avoids the signal interference to the anode of the light-emitting device 200. The data writing phase B23 is within the second sub-phase B12. That is, in the data writing phase B23, the first light-emitting control transistor T1 and the second light-emitting control transistor T2 remain off. In this way, it may be possible to avoid the interference of the first voltage signal line VDD and the light-emitting device 200 on the written data signal.

In the first initialization phase B21, an initialized voltage of the gate of the driving transistor T3 is a voltage Vinit1; the first light-emitting control transistor T1 is turned on during at least a part of the first initialization phase B21; the first electrode of the driving transistor T3 is a voltage VDD, and a large voltage difference (Vinit1−VDD) is developed between the gate and the source of the driving transistor T3, and the voltage difference (Vinit1−VDD) is greater than a voltage difference between the gate and the source of the driving transistor T3 in the light-emitting phase D of a previous display cycle. In this case, in the first initialization phase B21 of each frame, the driving transistor T3 has the same bias voltage, which is (Vinit1−VDD).

In the second initialization phase B22, the first light-emitting control transistor T1 and the second light-emitting control transistor T2 are turned off simultaneously, the first reset transistor T4 and the compensation transistor T5 are turned on, and the voltage of the first initialization signal line Vinit1 is transmitted to the gate and the second electrode (drain) of the driving transistor T3. At this time, the first electrode of the driving transistor T3 has a higher voltage (which is the first voltage VDD maintained during the first initialization phase B21), and the first electrode of the driving transistor T3 serves as the source and leaks current to the second electrode of the driving transistor T3, and the voltage of the first electrode of the driving transistor T3 is finally maintained at (Vinit1−Vth). The voltages of the gate, first electrode and second electrode of the driving transistor T3 in each display cycle and before the data writing phase B23 are independent of the voltages in the previous display cycle. Therefore, it may be possible to avoid the problem of brightness difference during grayscale switching, and in turn mitigating the problem of image sticking of the display panel. In addition, by increasing the duration of the first initialization phase B21 and the duration of the second initialization phase B22, the first initialization voltage Vinit1 may be more fully written into the gate of the driving transistor T3 and the second electrode of the driving transistor T3, and the voltage of the first electrode of the driving transistor T3 may be fully changed to (Vinit1−Vth), thus enhancing the mitigation effect of the image sticking.

It will be noted that when the driving transistor T3 is in an image of grayscale A for a long time, a voltage Vgs of the driving transistor T3 remains at a gate voltage of grayscale A minus VDD for a long time; and when the driving transistor T3 is in an image of grayscale C for a long time, the voltage Vgs of the driving transistor T3 remains at a gate voltage of grayscale C minus VDD for a long time. The drift degrees of characteristics of the driving transistor under the grayscale A and the grayscale C are different. In the case where the grayscale A is switched to grayscale B and in the case where the grayscale C is switched to grayscale B, the driving transistor T3 re-drifts due to a new Vgs voltage; and in this process, the brightness of the grayscale B gradually changes and tends to be stable. The industry usually uses a brightness contrast of two types of image switching, that is, switching from the grayscale A to the grayscale B and switching from grayscale C to the grayscale B, to indicate an image quality, which is the image sticking mentioned above.

In some embodiments, as shown in FIG. 22, in the second initialization phase B22 and the data writing phase B23, the second reset transistor T7 is turned on under control of the second scan signal from the second scan signal line GL2, and transmits the second initialization voltage signal from the second initialization voltage signal line Vinit2 to the second electrode of the second light-emitting control transistor T2, that is, transmits the second initialization voltage signal to the anode of the light-emitting device 200, thereby initializing the anode of the light-emitting device.

Figure 23:
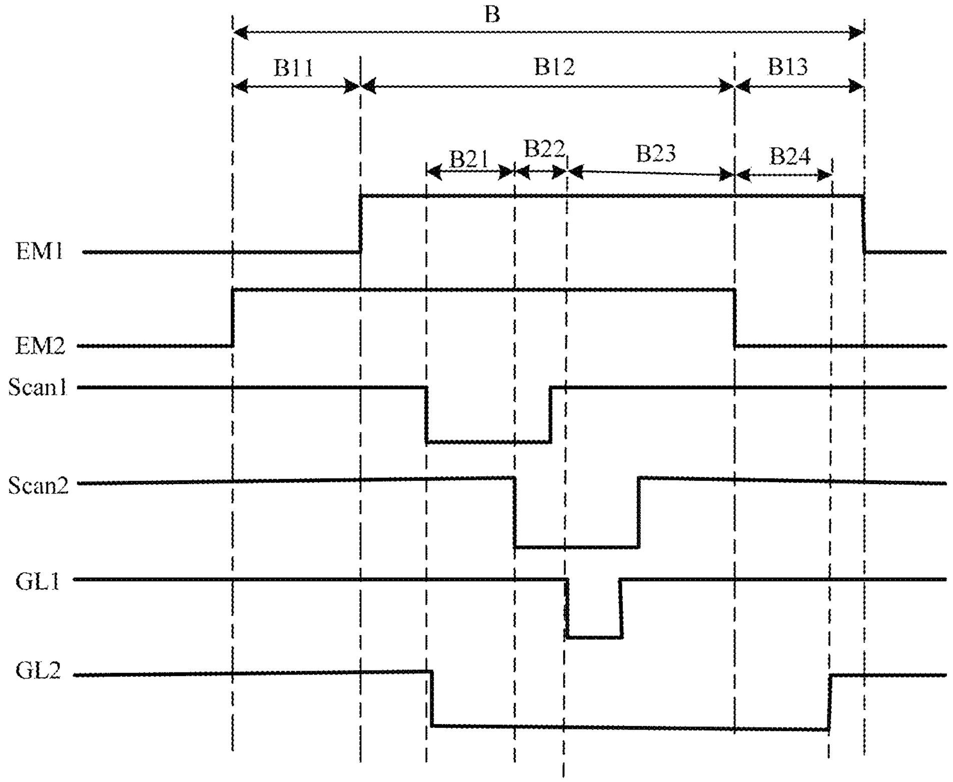
FIG. 23 is a control timing diagram of a pixel circuit, in accordance with some other embodiments.
Figure 24:
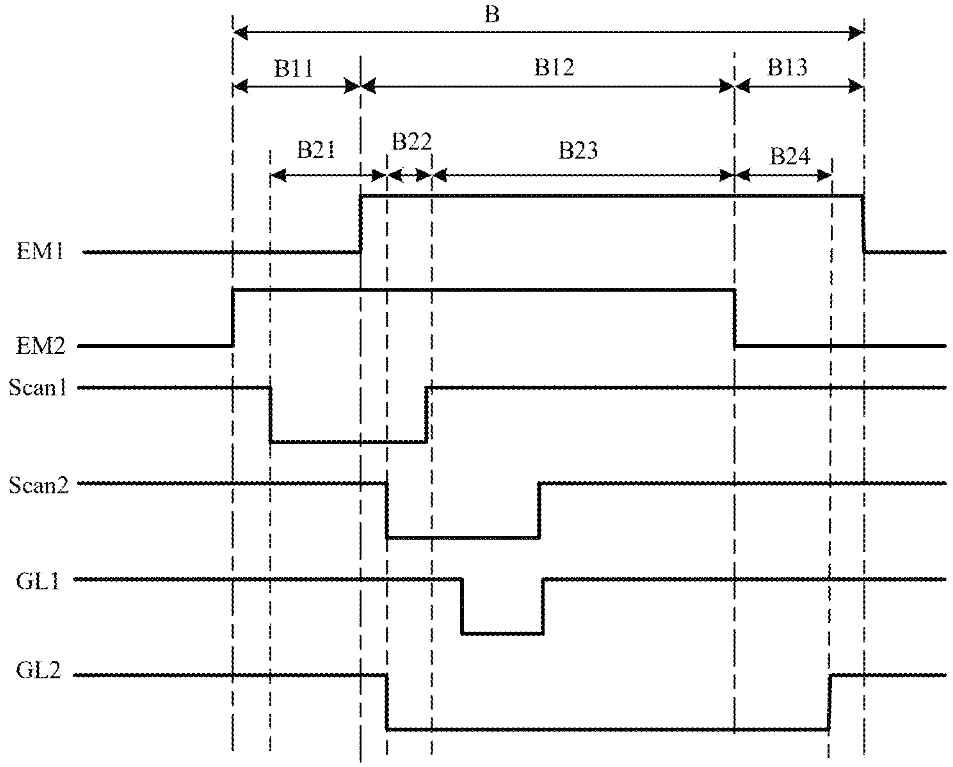
FIG. 24 is a control timing diagram of a pixel circuit, in accordance with yet some other embodiments.

In some embodiments, as shown in FIGS. 23 and 24, the blank phase B may further include a bias phase B24 following the data writing phase B23.

In the bias phase B24, the first light-emitting control signal line EM1 transmits a turn-off-level signal, and the first light-emitting control transistor T1 is turned off. The second light-emitting control signal line EM2 transmits an operating-level signal, and the second light-emitting control transistor T2 is turned on. The second reset transistor T7 is turned on under control of the second scan signal of the second scan signal line GL2, and transmits the second initialization voltage signal from the second initialization voltage signal terminal Vinit2 to the second electrode of the second light-emitting control transistor T2 and then to the first electrode of the second light-emitting control transistor T2 (the second electrode of the driving transistor).

In the bias phase B24, the first light-emitting control transistor T1, the first reset transistor T4, the compensation transistor T5 and the data writing transistor T6 are turned off, and the second reset transistor T7 and the second light-emitting control transistor T2 are turned on simultaneously. The voltage of the anode of the light-emitting device and the voltage of the second electrode of the driving transistor T3 are reset using the voltage of the second initialization voltage signal line Vinit2, so that the voltage of the second electrode of the driving transistor T3 is not affected by a previously written data signal. In a case where the light-emitting phase D includes a plurality of operating level periods (or the PWM signal adopts multi-pulse dimming), before each turn-on of the first light-emitting control transistor T1, the voltage of the second electrode of the driving transistor T3 is the same and is not affected by the written data signal, which may avoid flickering of the light-emitting device.

It will be noted that, in the data writing phase B23, a compensated data signal is written into the second electrode of the driving transistor T3, and the compensated data signal in each display cycle may be different. In this way, if the voltage of the second electrode of the driving transistor T3 is not reset, a residual voltage of the second electrode of the driving transistor T3 will affect the magnitude of the driving current in the light-emitting phase D. The residual voltage of the second electrode of the driving transistor T3 in each display cycle may have a different effect on the driving current. Therefore, it may cause visual strobing, which is the flickering mentioned above. The method for driving the pixel circuit provided in the embodiments of the present disclosure resets the voltage of the second electrode of the driving transistor T3 in the bias phase B24, thereby reducing or even avoiding the residual voltage of the driving transistor T3 and in turn reducing the risk of flickering of the light-emitting device.

Figure 25:
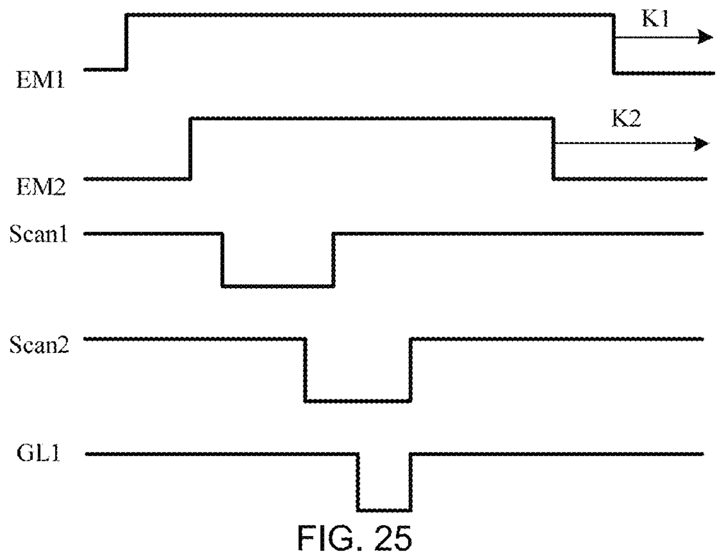
FIG. 25 is a control timing diagram of a pixel circuit, in accordance with yet some other embodiments.
Figure 26:
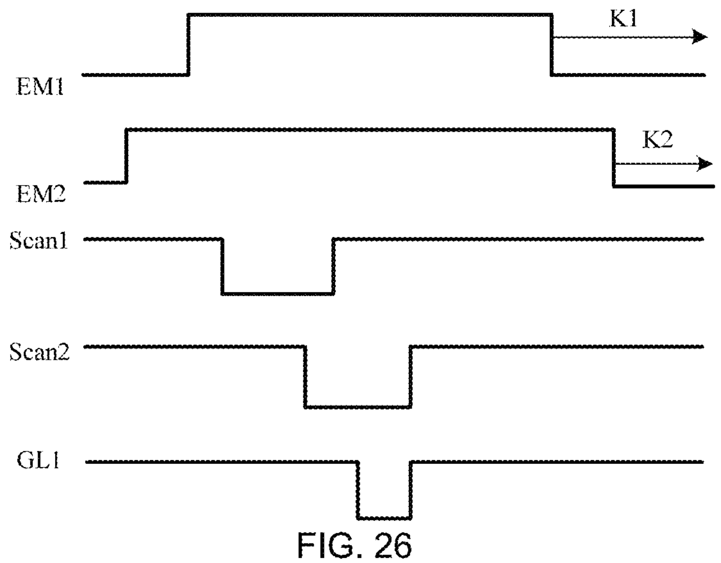
FIG. 26 is a control timing diagram of a pixel circuit, in accordance with yet some other embodiments.
Figure 27:
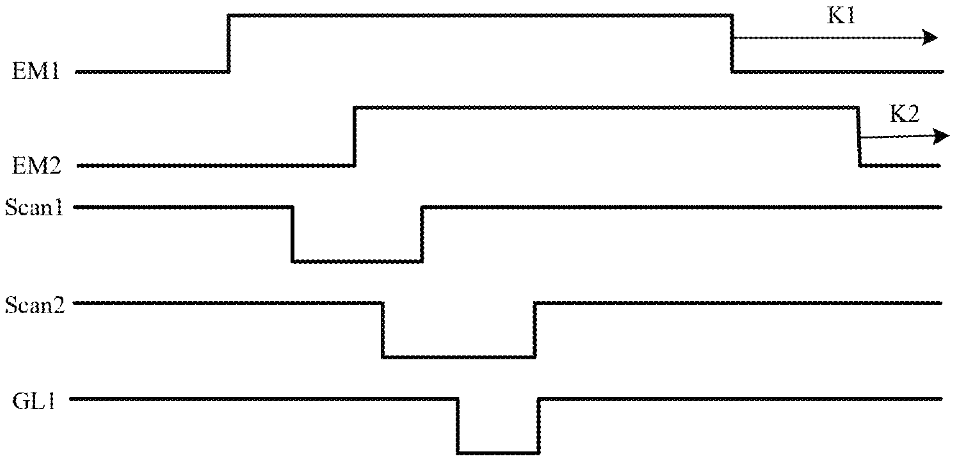
FIG. 27 is a control timing diagram of a pixel circuit, in accordance with yet some other embodiments.

Some other embodiments of the present disclosure further provide a method for driving a pixel circuit. For example, referring to FIG. 25, the first operating level period K1 is within the second operating level period K2, the start time of the first operating level period K1 and the start time of the second operating level period K2 are spaced apart, and the end time of the first operating level period K1 and the end time of the second operating level period K2 are spaced apart. Alternatively, referring to FIG. 26, the second operating level period K2 is within the first operating level period K1, the start time of the first operating level period K1 and the start time of the second operating level period K2 are spaced apart, and the end time of the first operating level period K1 and the end time of the second operating level period K2 are spaced apart. Alternatively, referring to FIG. 27, the first pulse width modulation signal PWM1 and the second pulse width modulation signal PWM2 have the same amplitude, same frequency and same duty cycle. In addition, the start time and the end time of the first operating level period K1 precede the start time and the end time of the second operating level period K2, respectively. Details will not be described in the embodiments of the present disclosure.

The foregoing descriptions are merely specific implementation manners of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

The invention claimed is:

1. An array substrate, comprising a substrate and a plurality of pixel circuits disposed on the substrate, wherein the plurality of pixel circuits are arranged in a plurality of rows and a plurality of columns, and a pixel circuit of the plurality of pixel circuits includes a first light-emitting control transistor and a second light-emitting control transistor;

the array substrate further comprises:

a first light-emitting control signal line electrically connected to a gate of the first light-emitting control transistor; and a second light-emitting control signal line electrically connected to a gate of the second light-emitting control transistor;

the array substrate further comprises a plurality of conductive layers, the first light-emitting control signal line and the second light-emitting control signal line are electrically insulated, the first light-emitting control signal line and the second light-emitting control signal line are located in different conductive layers, and an orthographic projection of the first light-emitting control signal line on the substrate does not overlap with an orthographic projection of the second light-emitting control signal line on the substrate; wherein the plurality of conductive layers include:

a first gate conductive layer including a first gate pattern and the second light-emitting control signal line, wherein the first gate pattern constitutes the gate of the first light-emitting control transistor; and a first source-drain conductive layer disposed on a side of the first gate conductive layer away from the substrate and including the first light-emitting control signal line, wherein the orthographic projection of the first light-emitting control signal line on the substrate partially overlaps with an orthographic projection of the first gate pattern on the substrate, and the first light-emitting control signal line is electrically connected to the first gate pattern.

2. The array substrate according to claim 1, wherein the pixel circuit further includes a driving transistor;

the array substrate further comprises a semiconductor layer disposed between the substrate and the first gate conductive layer, wherein the semiconductor layer includes a first channel region of the first light-emitting control transistor, a second channel region of the second light-emitting control transistor, a third channel region of the driving transistor, a first connection region and a second connection region; the first connection region and the second connection region are respectively located on two opposite sides of the third channel region; the first connection region is connected to the third channel region and the second channel region; the second connection region is connected to the third channel region and the first channel region;

wherein the orthographic projection of the first gate pattern on the substrate partially overlaps with an orthographic projection of the first channel region on the substrate, and does not overlap with an orthographic projection of the first connection region on the substrate; and the orthographic projection of the second light-emitting control signal line on the substrate partially overlaps with an orthographic projection of the second channel region on the substrate.

3. The array substrate according to claim 2, wherein the pixel circuit further includes a first reset transistor;

the semiconductor layer further includes a third connection region and a fourth channel region of the first reset transistor;

the first gate conductive layer further includes a fourth gate pattern, and an orthographic projection of the fourth gate pattern on the substrate partially overlaps with an orthographic projection of the fourth channel region on the substrate;

the first source-drain conductive layer further includes a first enable signal line and a first transfer block; an orthographic projection of the first enable signal line on the substrate partially overlaps with the orthographic projection of the fourth gate pattern on the substrate; the first enable signal line is electrically connected to the fourth gate pattern; the first transfer block is electrically connected to the third connection region and a gate of the driving transistor;

the array substrate further comprises a second gate conductive layer; the second gate conductive layer is disposed between the first gate conductive layer and the first source-drain conductive layer, and includes a first initialization voltage signal line; and the first initialization voltage signal line is electrically connected to a first electrode of the first reset transistor.

4. The array substrate according to claim 3, wherein the pixel circuit further includes a compensation transistor;

the semiconductor layer further includes a fifth channel region of the compensation transistor, an end of the fifth channel region is connected to the first connection region, and another end of the fifth channel region is connected to the third connection region;

the first gate conductive layer further includes a fifth gate pattern, and an orthographic projection of the fifth gate pattern on the substrate partially overlaps with an orthographic projection of the fifth channel region on the substrate;

the first source-drain conductive layer further includes a second enable signal line; an orthographic projection of the second enable signal line on the substrate partially overlaps with the orthographic projection of the fifth gate pattern on the substrate; and the second enable signal line is electrically connected to the fifth gate pattern.

5. The array substrate according to claim 4, wherein the compensation transistor is a double-gate transistor, and the fifth channel region includes a first sub-region and a second sub-region that are spaced apart;

the semiconductor layer further includes a fourth connection region, and the fourth connection region is located between the first sub-region and the second sub-region and connected to the first sub-region and the second sub-region;

the second gate conductive layer further includes a first blocking portion, and an orthographic projection of the first blocking portion on the substrate at least partially overlaps with an orthographic projection of the fourth connection region on the substrate.

6. The array substrate according to claim 4, wherein the second gate conductive layer further includes a second blocking portion; and orthographic projections, on the substrate, of the second blocking portion, the third connection region, and the second enable signal line at least partially overlap.

7. The array substrate according to claim 4, wherein the pixel circuit further includes a data writing transistor;

the semiconductor layer further includes a sixth channel region of the data writing transistor; the fifth channel region and the sixth channel region are staggered in a first direction;

the sixth channel region is connected to the second connection region; the first direction is a column direction in which the plurality of pixel circuits are arranged;

the first gate conductive layer further includes a sixth gate pattern, and an orthographic projection of the sixth gate pattern on the substrate partially overlaps with an orthographic projection of the sixth channel region on the substrate;

the first source-drain conductive layer further includes a first scan signal line; an orthographic projection of the first scan signal line on the substrate partially overlaps with the orthographic projection of the sixth gate pattern on the substrate; and the first scan signal line is electrically connected to the sixth gate pattern.

8. The array substrate according to claim 3, wherein the pixel circuit further includes a second reset transistor;

the semiconductor layer further includes a seventh channel region of the second reset transistor;

the first gate conductive layer further includes a seventh gate pattern, and an orthographic projection of the seventh gate pattern on the substrate partially overlaps with an orthographic projection of the seventh channel region on the substrate;

the second gate conductive layer further includes a second initialization voltage signal line, and the second initialization voltage signal line is electrically connected to a first electrode of the second reset transistor;

the first source-drain conductive layer further includes a second scan signal line; an orthographic projection of the second scan signal line on the substrate partially overlaps with the orthographic projection of the seventh gate pattern on the substrate; and the second scan signal line is electrically connected to the seventh gate pattern.

9. The array substrate according to claim 2, further comprising:

a light-shielding layer disposed between the substrate and the semiconductor layer, wherein an orthographic projection of the light-shielding layer on the substrate at least partially overlaps with an orthographic projection of the semiconductor layer on the substrate.

10. The array substrate according to claim 1, wherein the array substrate has a display region and a peripheral region surrounding the display region;

the array substrate comprises a plurality of first initialization voltage signal lines, a plurality of second initialization voltage signal lines and a second voltage signal bus; a row of pixel circuits is electrically connected to a single first initialization voltage signal line and a single second initialization voltage signal line; and the second voltage signal bus is disposed in the peripheral region and at least partially surrounds the display region;

the array substrate further comprises a second source-drain conductive layer; the second source-drain conductive layer is disposed on a side of the first source-drain conductive layer away from the substrate, and includes a plurality of first connection lines extending in a first direction, a plurality of second connection lines extending in the first direction, and a plurality of third connection lines extending in the first direction; each first connection line is electrically connected to the plurality of first initialization voltage signal lines; each second connection line is electrically connected to the plurality of second initialization voltage signal lines; and each third connection line extends to the peripheral region and is electrically connected to the second voltage signal bus.

11. A method for driving a pixel circuit, wherein the pixel circuit includes a driving transistor, a first light-emitting control transistor, and a second light-emitting control transistor; a gate of the first light-emitting control transistor is electrically connected to a first light-emitting control signal line, a first electrode of the first light-emitting control transistor is electrically connected to a first voltage signal line, and a second electrode of the first light-emitting control transistor is electrically connected to a first electrode of the driving transistor; a gate of the second light-emitting control transistor is electrically connected to a second light-emitting control signal line, a first electrode of the second light-emitting control transistor is electrically connected to a second electrode of the driving transistor, and a second electrode of the second light-emitting control transistor is electrically connected to a light-emitting device; the first light-emitting control signal line is configured to transmit a first pulse width modulation signal, and the second light-emitting control signal line is configured to transmit a second pulse width modulation signal;

a display cycle includes a light-emitting phase; and the method comprises that:

in the light-emitting phase, the first pulse width modulation signal has a first operating level period, the second pulse width modulation signal has a second operating level period, the first operating level period is different from the second operating level period, and the first operating level period partially overlaps with the second operating level period, wherein an amplitude of the first pulse width modulation signal is the same as an amplitude of the second pulse width modulation signal, a frequency of the first pulse width modulation signal is the same as a frequency of the second pulse width modulation signal, and a duty cycle of the first pulse width modulation signal is the same as a duty cycle of the second pulse width modulation signal; and a start time of the first operating level period is later than a start time of the second operating level period, and an end time of the first operating level period is later than an end time of the second operating level period.

12. The method according to claim 11, wherein the pixel circuit further includes a first reset transistor, a second reset transistor, a data writing transistor and a compensation transistor; a gate of the first reset transistor is electrically connected to a first enable signal line, a first electrode of the first reset transistor is electrically connected to a first initialization voltage signal line, and a second electrode of the first reset transistor is electrically connected to a gate of the driving transistor; a gate of the second reset transistor is electrically connected to a second scan signal line, a first electrode of the second reset transistor is electrically connected to a second initialization voltage signal line, and a second electrode of the second reset transistor is electrically connected to the second electrode of the second light-emitting control transistor; a gate of the data writing transistor is electrically connected to a first scan signal line, a first electrode of the data writing transistor is electrically connected to a data line, and a second electrode of the data writing transistor is electrically connected to the first electrode of the driving transistor; a gate of the compensation transistor is electrically connected to a second enable signal line, a first electrode of the compensation transistor is electrically connected to the second electrode of the driving transistor, and a second electrode of the compensation transistor is electrically connected to the gate of the driving transistor;

the display cycle further includes a blank phase; in the blank phase, at least one of the first light-emitting control transistor and the second light-emitting control transistor is turned off; the blank phase includes a first initialization phase, a second initialization phase and a data writing phase;

the method further comprises as follows that:

in the first initialization stage, the first reset transistor is turned on under control of a first enable signal from the first enable signal line and transmits a first initialization voltage signal from the first initialization voltage signal line to the gate of the driving transistor;

in the second initialization phase, the first reset transistor remains on, and the compensation transistor is turned on under control of a second enable signal from the second enable signal line and transmits the first initialization voltage signal to the second electrode of the driving transistor; and in the data writing phase, the compensation transistor remains on, and the data writing transistor is turned on under control of a first scan signal from the first scan signal line and transmits a data signal from the data line to the first electrode of the driving transistor.

13. The method according to claim 12, wherein the blank phase further includes a bias phase following the data writing phase; the method further comprises that:

in the bias phase, the first light-emitting control transistor is turned off, the second light-emitting control transistor is turned on, and the second reset transistor is turned on under control of a second scan signal of the second scan signal line and transmits a second initialization voltage signal from the second initialization voltage signal line to the second electrode of the second light-emitting control transistor and then to the first electrode of the driving transistor.

14. The method according to claim 12, wherein in the second initialization phase and the data writing phase, the second reset transistor is turned on under control of the second scan signal from the second scan signal line and transmits the second initialization voltage signal from the second initialization voltage signal line to the second electrode of the second light-emitting control transistor.

15. A method for driving a pixel circuit, wherein the pixel circuit includes a driving transistor, a first light-emitting control transistor, and a second light-emitting control transistor; a gate of the first light-emitting control transistor is electrically connected to a first light-emitting control signal line, a first electrode of the first light-emitting control transistor is electrically connected to a first voltage signal line, and a second electrode of the first light-emitting control transistor is electrically connected to a first electrode of the driving transistor; a gate of the second light-emitting control transistor is electrically connected to a second light-emitting control signal line, a first electrode of the second light-emitting control transistor is electrically connected to a second electrode of the driving transistor, and a second electrode of the second light-emitting control transistor is electrically connected to a light-emitting device; the first light-emitting control signal line is configured to transmit a first pulse width modulation signal, and the second light-emitting control signal line is configured to transmit a second pulse width modulation signal;

a display cycle includes a light-emitting phase; and the method comprises that:

in the light-emitting phase, the first pulse width modulation signal has a first operating level period, the second pulse width modulation signal has a second operating level period, the first operating level period is different from the second operating level period, and the first operating level period partially overlaps with the second operating level period, wherein an amplitude of the first pulse width modulation signal is the same as an amplitude of the second pulse width modulation signal, a frequency of the first pulse width modulation signal is the same as a frequency of the second pulse width modulation signal, and a duty cycle of the first pulse width modulation signal is the same as a duty cycle of the second pulse width modulation signal; and a start time of the first operating level period is earlier than a start time of the second operating level period, and an end time of the first operating level period is earlier than an end time of the second operating level period; or the first operating level period is within the second operating level period, a start time of the first operating level period and a start time of the second operating level period are spaced apart, and an end time of the first operating level period and an end time of the second operating level period are spaced apart.

16. A display panel, comprising:

the array substrate according to claim 1; and a plurality of light-emitting devices disposed on the array substrate, each light-emitting device being electrically connected to a pixel circuit.

17. A display apparatus, comprising:

the display panel according to claim 16; and a driver circuit board electrically connected to the display panel and configured to transmit control signals to the display panel.

* * * * *